(12) United States Patent
Brandwine et al.

(10) Patent No.: US 8,510,821 B1
(45) Date of Patent: Aug. 13, 2013

(54) TIERED NETWORK FLOW ANALYSIS

(75) Inventors: Eric Jason Brandwine, Haymarket, VA (US); Swaminathan Sivasubramanian, Seattle, WA (US); Bradley E. Marshall, Bainbridge Island, WA (US); Tate Andrew Certain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 455 days.

(21) Appl. No.: 12/825,718

(22) Filed: Jun. 29, 2010

(51) Int. Cl.
*G06F 15/16* (2006.01)
*G06F 11/00* (2006.01)
*G06F 11/30* (2006.01)

(52) U.S. Cl.
USPC ............... 726/11; 726/23; 726/24; 713/187; 709/229; 709/250

(58) Field of Classification Search
USPC .............. 713/187–188, 193–194; 726/22–25
See application file for complete search history.

(56) References Cited

U.S. PATENT DOCUMENTS

| 7,367,057 B2 * | 4/2008 | Das et al. .................... 726/24 |
| 7,984,304 B1 * | 7/2011 | Waldspurger et al. ....... 713/187 |
| 2005/0076227 A1 * | 4/2005 | Kang et al. ................... 713/188 |

OTHER PUBLICATIONS

Counter Hack Reloaded A Step-By-Step Guide to Computer Attacks and Effective Defenses, Second Edition, Ed Skoudis, et al., dated Nov. 2006, pp. 59-66.
How the 'Net works: An Introduction to Peering and Transit; Rudolph van der Berg; dated Sep. 2, 2008.
VL2: A Scalable and Flexible Data Center Network; Albert Greenberg, et al.; dated Aug. 2009.
Cisco Policy Based Routing White Paper; accessed Jun. 7, 2010.
Internet Security Systems, Distributed Denial of Service Attack Tools; accessed Jun. 7, 2010.
B. Pfaff, et al., Extending Networking into the Virtualization Layer, Proceedings of the 8th ACM Workshop on Hot Topics in Networks (HotNets—VIII), New York City, New York (Oct. 2009).
Towards A Next Generation Data Center Architecture: Scalability and Commoditization; Albert Greenberg, et al.; dated Aug. 22, 2008.

* cited by examiner

*Primary Examiner* — Evans Desrosiers
(74) *Attorney, Agent, or Firm* — Knobbe Martens Olson & Bear LLP

(57) ABSTRACT

The effects on networking systems of attacks on vulnerabilities, such as vulnerable modules in a webserver, SYN flooding, etc., can be devastating to a network environment. In various embodiments, a first, quick, or inexpensive analysis is performed on incoming network flows. If an intrusion issue or other problem is suspected based on the first, rapid, or an inexpensive analysis, then the flow can be flagged for redirection to another process, virtual machine, or physical computer module that will perform a deeper, more expensive analysis on the network flow. If there are no issues detected in the second, deeper analysis, then the network flow can be forwarded to its intended recipient. If an issue is detected in the second, deeper analysis, then the network flow can be throttled, quarantined, ignored, sent to an un-trusted portion of the system, sent for more analysis, or otherwise handled or flagged.

23 Claims, 12 Drawing Sheets ions network, or a series of communication networks, to exchange data. In a common embodiment, data to be exchanged is divided into a series of packets that can be transmitted between a sending computing device and a recipient computing device. In general, each packet can be considered to include two primary components, namely, control information and payload data. The control information corresponds to information utilized by one or more communication networks to deliver the payload data. For example, control information can include source and destination network addresses, error detection codes, and packet sequencing identification, and the like. Typically, control information is found in packet headers and trailers included within the packet and adjacent to the payload data.

TIERED NETWORK FLOW ANALYSIS

BACKGROUND

Generally described, computing devices utilize a communication network, or a series of communication networks, to exchange data. In a common embodiment, data to be exchanged is divided into a series of packets that can be transmitted between a sending computing device and a recipient computing device. In general, each packet can be considered to include two primary components, namely, control information and payload data. The control information corresponds to information utilized by one or more communication networks to deliver the payload data. For example, control information can include source and destination network addresses, error detection codes, and packet sequencing identification, and the like. Typically, control information is found in packet headers and trailers included within the packet and adjacent to the payload data.

In practice, in a packet-switched communication network, packets are transmitted among multiple physical networks, or sub-networks. Generally, the physical networks include a number of hardware devices that receive packets from a source network component and forward the packet to a recipient network component. The packet routing hardware devices are typically referred to as routers. Generally described, routers can operate with two primary functions or planes. The first function corresponds to a control plane, in which the router learns the set of outgoing interfaces that are most appropriate for forwarding received packets to specific destinations. The second function is a forwarding plane, in which the router sends the received packet to an outbound interface.

To execute the control plane functionality, routers can maintain a forwarding information base ("FIB") that identifies, among other packet attribute information, destination information for at least a subset of possible network addresses, such as Internet Protocol ("IP") addresses. In a typical embodiment, the FIB corresponds to a table of values specifying network forwarding information for the router.

With the advent of virtualization technologies, networks and routing for those networks can now be simulated using commodity hardware rather than actual routers. For example, virtualization technologies such as those provided by VMWare, XEN, or User-Mode Linux may allow a single physical computing machine to be shared among multiple virtual networks by providing each virtual network user with one or more virtual machines hosted by the single physical computing machine, with each such virtual machine being a software simulation acting as a distinct logical computing system that provides users with the illusion that they are the sole operators and administrators of a given hardware computing resource. In addition, as routing is accomplished through software, additional routing flexibility is provided to the virtual network in comparison with traditional routing, such as allowing the use of supplemental information for determining network routing.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
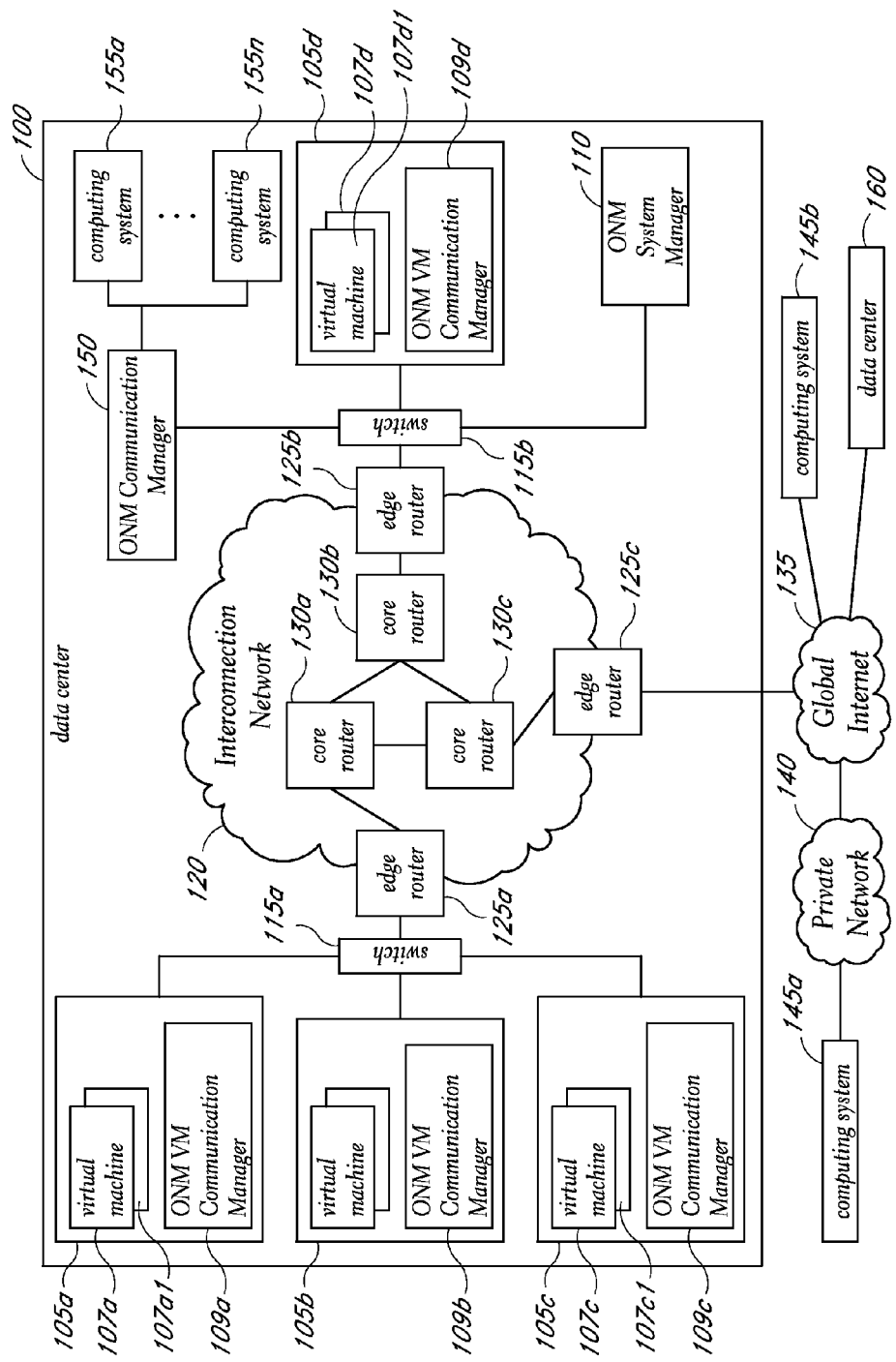
FIG. 1 is a network diagram illustrating an embodiment of a substrate network having computing nodes associated with a virtual computer network.

Herein are provided system, methods, processes, techniques, and computer-readable storage media for performing tiered network flow analysis. These can include a first-tier analysis module and a second-tier analysis module, and possibly subsequent tiers of analysis modules. In some embodiments, the first-tier analysis module can be configured to receive a network flow; perform a first-tier analysis on the network flow to detect any matches to a first set of criteria; and in response to detecting a match to a first set of criteria during the first-tier analysis of the network flow, flagging the network flow to be subsequently redirected to the second-tier analysis module for further analysis. In some embodiments, the second-tier analysis module is configured to perform a second-tier analysis on the network flow received from the first-tier analysis module; and in response to detecting any matches to a second set of criteria during the second-tier analysis of the network flow, perform an action in response to matching the second set of criteria; and in response to not detecting any matches to the second set of criteria during the second-tier analysis of the network flow, forward the network flow to an intended recipient of the network flow.

In a network, multiple computing routing systems can be interconnected and interdependent. One of the problems with such ubiquitous interconnection is, however, that networks are often vulnerable to intrusion attacks. Examples of such attacks include SYN flooding, attacking vulnerabilities in the system (e.g., a particular module in a webserver), sending viruses or worms, etc. One problem with many current networking systems is that these systems cannot adequately and quickly detect intrusion attacks while still allowing reasonable network throughput and latency. Further, detecting unwanted activity can be a strain on resources.

As such, in various embodiments herein, a first, rapid, or computationally inexpensive analysis is performed on incoming network flows. If an intrusion issue or other problem is suspected based on the first analysis, then the flow can be redirected to another process, virtual machine, or physical computer that will perform a deeper, more expensive analysis on the network flow. If there are no issues detected in the second, deeper analysis, then the network flow can be forwarded to its intended recipient. If an issue is detected in the second, deeper analysis, then the network flow can be ignored, sent to an untrusted portion of the system, delayed, or otherwise handled or flagged. Some embodiments of the systems, methods, techniques, and computer-readable storage media described herein can also be used to perform other types of analysis on incoming network flows, such as sending a user's network traffic to an untrusted server until that user has been authenticated, at which time the user's network traffic would be sent to trusted server. Various of the techniques described herein can be used to perform intrusion analysis or other forms of traffic analysis (e.g., determining information about who is browsing to a website), market research, security, etc.

The following section discusses various embodiments of managed networks for tiered network flow analysis. Following that is further discussion of tiered network flow analysis.

Managed Computer Networks for Tiered Network Flow Analysis

With the advent of virtualization technologies, networks and routing for those networks can now be simulated using commodity hardware rather than actual routers. For example, virtualization technologies can be adapted to allow a single physical computing machine to be shared among multiple virtual networks by hosting one or more virtual machines on the single physical computing machine. Each such virtual machine can be a software simulation acting as a distinct logical computing system that provides users with the illusion that they are the sole operators and administrators of a given hardware computing resource. In addition, as routing can be accomplished through software, additional routing flexibility can be provided to the virtual network in comparison with traditional routing. As a result, in some implementations, supplemental information other than packet information can be used to determine network routing.

In this disclosure, techniques are described for providing logical networking functionality for managed computer networks, such as for virtual computer networks that are provided on behalf of users or other entities. In at least some embodiments, the techniques enable a user to configure or specify a network topology, routing costs, and/or routing paths for a virtual or overlay computer network including logical networking devices that are each associated with a specified group of multiple physical computing nodes. With the network configuration specified for a virtual computer network, the functionally and operation of the virtual network can be simulated on physical computing nodes operating virtualization technologies. In some embodiments, multiple users or entities (e.g. businesses or other organizations) can access the system as tenants of the system, each having their own virtual network in the system. In one embodiment, a user's access and/or network traffic is transparent to other users. For example, even though physical components of a network may be shared, a user of a virtual network may not see another user's network traffic on another virtual network if monitoring traffic on the virtual network.

Figure 2:
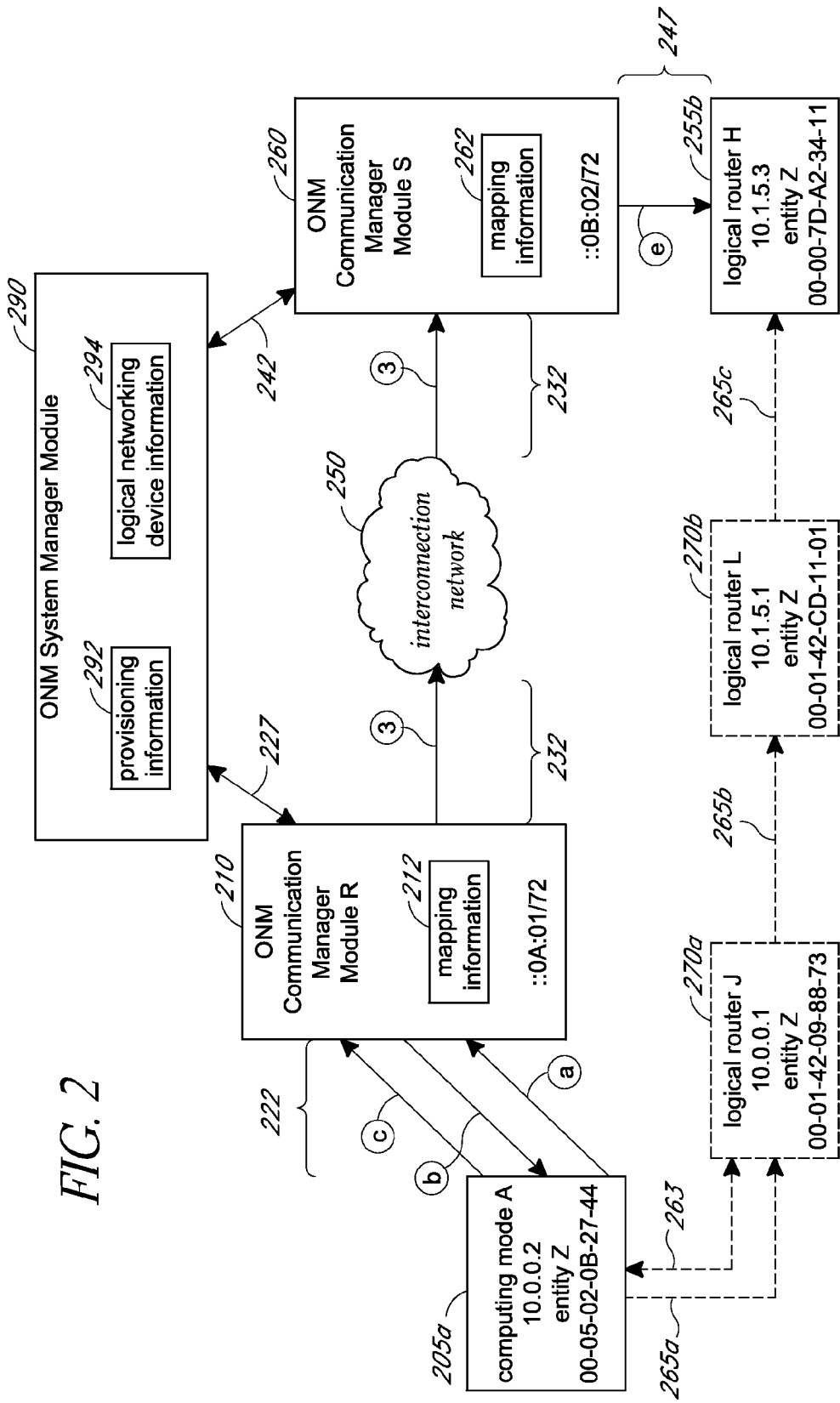
FIG. 2 illustrates an example embodiment of a virtual computer network supporting logical networking functionality.

By way of overview, FIGS. 1 and 2 discuss embodiments where communications between multiple computing nodes of the virtual computer network emulate functionality that would be provided by logical networking devices if they were physically present. In some embodiments, some or all of the emulation are performed by an overlay network manager system. FIGS. 2-4B and 7B discuss embodiments where substrate routing decisions can be made independently of any simulated routing in the overlay network, allowing, for example, optimization of traffic on the substrate network based on information unavailable to a virtual network user. FIGS. 5A-7A discuss embodiments where routing decisions implemented on the virtual or overlay network are propagated to the substrate network. Thus, a user can specify cost functions for the overlay network that can be used to make routing decisions in the substrate network.

Overlay Network Manager

FIG. 1 is a network diagram illustrating an embodiment of an overlay network manager system (ONM) for managing computing nodes associated with a virtual computer network. Virtual network communications can be overlaid on one or more intermediate physical networks in a manner transparent to the computing nodes. In this example, the ONM system includes a system manager module 110 and multiple communication manager modules 109a, 109b, 109c, 109d, 150 to facilitate the configuring and managing communications on the virtual computer network.

The illustrated example includes an example data center 100 with multiple physical computing systems operated on behalf of the ONM system. The example data center 100 is connected to a global internet 135 external to the data center 100. The global internet can provide access to one or more computing systems 145a via private network 140, to one or more other globally accessible data centers 160 that each have multiple computing systems, and to one or more other computing systems 145b. The global internet 135 can be a publicly accessible network of networks, such as the Internet, and the 1private network 140 can be an organization's network that is wholly or partially inaccessible from computing systems external to the private network 140. Computing systems 145b can be home computing systems or mobile computing devices that each connects directly to the global internet 135 (e.g., via a telephone line, cable modem, a Digital Subscriber Line ("DSL"), cellular network or other wireless connection, etc.).

The example data center 100 includes a number of physical computing systems 105a-105d and 155a-155n, as well as a Communication Manager module 150 that executes on one or more other computing systems to manage communications for the associated computing systems 155a-155n. The example data center further includes a System Manager module 110 that executes on one or more computing systems. In this example, each physical computing system 105a-105d hosts multiple virtual machine computing nodes and includes an associated virtual machine ("VM") communication manager module (e.g., as part of a virtual machine hypervisor monitor for the physical computing system). Such VM communications manager modules and VM computing nodes include VM Communication Manager module 109a and virtual machines 107a on host computing system 105a, and VM Communication Manager module 109d and virtual machines 107d on host computing system 105d. Physical computing systems 155a-155n do not execute any virtual machines in this example, and thus can each act as a computing node that directly executes one or more software programs on behalf of a user. The Communication Manager module 150 that manages communications for the associated computing systems 155a-155n can have various forms, such as, for example, a proxy computing device, firewall device, or networking device (e.g., a switch, router, hub, etc.) through which communications to and from the physical computing systems travel. In other embodiments, all or none of the physical computing systems at the data center host virtual machines.

This example data center 100 further includes multiple physical networking devices, such as switches 115a-115b, edge router devices 125a-125c, and core router devices 130a-

130c. Switch 115a is part of a physical sub-network that includes physical computing systems 105a-105c, and is connected to edge router 125a. Switch 115b is part of a distinct physical sub-network that includes physical computing systems 105d and 155a-155n, as well as the computing systems providing the Communication Manager module 150 and the System Manager module 110, and is connected to edge router 125b. The physical sub-networks established by switches 115a-115b, in turn, are connected to each other and other networks (e.g., the global internet 135) via an intermediate interconnection network 120, which includes the edge routers 125a-125c and the core routers 130a-130c. The edge routers 125a-125c provide gateways between two or more sub-networks or networks. For example, edge router 125a provides a gateway between the physical sub-network established by switch 115a and the interconnection network 120, while edge router 125c provides a gateway between the interconnection network 120 and global internet 135. The core routers 130a-130c manage communications within the interconnection network 120, such as by routing or otherwise forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on the physical network topology, etc.).

The System Manager module 110 and Communication Manager modules 109, 150 can configure, authorize, and otherwise manage communications between associated computing nodes, including providing logical networking functionality for one or more virtual computer networks that are provided using the computing nodes. For example, Communication Manager module 109a and 109c manages associated virtual machine computing nodes 107a and 107c and each of the other Communication Manager modules can similarly manage communications for a group of one or more other associated computing nodes. The Communication Manager modules can configure communications between computing nodes so as to overlay a virtual network over one or more intermediate physical networks that are used as a substrate network, such as over the interconnection network 120.

Furthermore, a particular virtual network can optionally be extended beyond the data center 100, such as to one or more other data centers 160 which can be at geographical locations distinct from the first data center 100. Such data centers or other geographical locations of computing nodes can be interconnected in various manners, including via one or more public networks, via a private connection such as a direct or VPN connection, or the like. In addition, such data centers can each include one or more other Communication Manager modules that manage communications for computing systems at that data. In some embodiments, a central Communication Manager module can coordinate and manage communications among multiple data centers.

Thus, as one illustrative example, one of the virtual machine computing nodes 107a1 on computing system 105a can be part of the same virtual local computer network as one of the virtual machine computing nodes 107d1 on computing system 105d. The virtual machine 107a1 can then direct an outgoing communication to the destination virtual machine computing node 107d1, such as by specifying a virtual network address for that destination virtual machine computing node. The Communication Manager module 109a receives the outgoing communication, and in at least some embodiments determines whether to authorize the sending of the outgoing communication. By filtering unauthorized communications to computing nodes, network isolation and security of entities' virtual computer networks can be enhanced.

The Communication Manager module 109a can determine the actual physical network location corresponding to the destination virtual network address for the communication. For example, the Communication Manager module 109a can determine the actual destination network address by dynamically interacting with the System Manager module 110, or can have previously determined and stored that information. The Communication Manager module 109a then re-headers or otherwise modifies the outgoing communication so that it is directed to Communication Manager module 109d using an actual substrate network address.

When Communication Manager module 109d receives the communication via the interconnection network 120, it obtains the virtual destination network address for the communication (e.g., by extracting the virtual destination network address from the communication), and determines to which virtual machine computing nodes 107d the communication is directed. The Communication Manager module 109d then re-headers or otherwise modifies the incoming communication so that it is directed to the destination virtual machine computing node 107d1 using an appropriate virtual network address for the virtual computer network, such as by using the sending virtual machine computing node 107a1's virtual network address as the source network address and by using the destination virtual machine computing node 107d1's virtual network address as the destination network address. The Communication Manager module 109d then forwards the modified communication to the destination virtual machine computing node 107d1. In at least some embodiments, before forwarding the incoming communication to the destination virtual machine, the Communication Manager module 109d can also perform additional steps related to security.

Further, the Communication Manager modules 109a and/or 109c on the host computing systems 105a and 105c can perform additional actions that correspond to one or more logical specified router devices lying between computing nodes 107a1 and 107c1 in the virtual network topology. For example, the source computing node 107a1 can direct a packet to a logical router local to computing node 107a1 (e.g., by including a virtual hardware address for the logical router in the packet header), with that first logical router being expected to forward the packet to the destination node 107c1 via the specified logical network topology. The source Communication Manager module 109a receives or intercepts the packet for the logical first router device and can emulate functionality of some or all of the logical router devices in the network topology, such as by modifying a TTL ("time to live") hop value for the communication, modifying a virtual destination hardware address, and/or otherwise modify the communication header. Alternatively, some or all the emulation functionality can be performed by the destination Communication Manager module 109c after it receives the packet.

By providing logical networking functionality, the ONM system provides various benefits. For example, because the various Communication Manager modules manage the overlay virtual network and can emulate the functionality of logical networking devices, in certain embodiments specified networking devices do not need to be physically implemented to provide virtual computer networks, allowing greater flexibility in the design of virtual user networks. Additionally, corresponding modifications to the interconnection network 120 or switches 115a-115b are generally not needed to support particular configured network topologies. Nonetheless, a particular network topology for the virtual computer network can be transparently provided to the computing nodes and software programs of a virtual computer network.

Logical/Virtual Networking

FIG. 2 illustrates a more detailed implementation of the ONM system of FIG. 1 supporting logical networking functionality. The ONM system includes more detailed embodiments of the ONM System Manager and ONM Communication. Manager of FIG. 1. In FIG. 2, computing node A is sending a communication to computing node H, and the actions of the physically implemented modules 210 and 260 and devices of network 250 in actually sending the communication are shown, as well as emulated actions of the logical router devices 270a and 270b in logically sending the communication.

In this example, computing nodes A 205a and H 255b are part of a single virtual computer network for entity Z. However, computing nodes can be configured to be part of two distinct sub-networks of the virtual computer network and the logical router devices 270a and 270b separate the computing nodes A and H in the virtual network topology. For example, logical router device J 270a can be a local router device to computing node A and logical router device L 270b can be a local router device to computing node H.

In FIG. 2, computing nodes A 205a and H 255b includes hardware addresses associated with those computing nodes for the virtual computer network, such as virtual hardware addresses that are assigned to the computing nodes by the System Manager module 290 and/or the Communication Manager modules R 210 and S 260. In this example, computing node A has been assigned hardware address "00-05-02-0B-27-44," and computing node H has been assigned hardware address "00-00-7D-A2-34-11." In addition, the logical router devices 3 and L have also each been assigned hardware addresses, which in this example are "00-01-42-09-88-73" and "00-01-42-CD-11-01," respectively, as well as virtual network addresses, which in this example are "10.0.0.1" and "10.1.5.1," respectively. The System Manager module 290 maintains provisioning information 292 that identifies where each computing node is actually located and to which entity and/or virtual computer network the computing node belongs.

In this example, computing node A 205a first sends an address resolution protocol (ARP) message request 222-a for virtual hardware address information, where the message is expected to first pass through a logical device J before being forwarded to computing node H. Accordingly, the ARP message request 222-a includes the virtual network address for logical router J (e.g., "10.0.0.1") and requests the corresponding hardware address for logical router J.

Communication Manager module R intercepts the ARP request 222-a, and obtains a hardware address to provide to computing node A as part of spoofed ARP response message 222-b. The Communication Manager module R can determine the hardware address by, for example, looking up various hardware address information in stored mapping information 212, which can cache information about previously received communications. Communication Manager module R can communicate 227 with the System Manager module 290 to translate the virtual network address for logical router J.

The System Manager module 290 can maintain information 294 related to the topology and/or components of virtual computer networks and provide that information to Communication Manager modules. The Communication Manager module R can then store the received information as part of mapping information 212 for future use. Communication Manager module R then provides computing node A with the hardware address corresponding to logical router J as part of response message 222-b. While request 222-a and response message 222-b actually physically pass between computing node A and Communication Manager module R, from the standpoint of computing node A, its interactions occur with local router device J.

After receiving the response message 222-b, computing node A 205a creates and initiates the sending of a communication 222-c to computing node H 255b. From the standpoint of computing node A, the sent communication will be handled as if logical router J 270a were physically implemented. For example, logical router J could modify the header of the communication 265a and forward the modified communication 265b to logical router L 270a, which would similarly modify the header of the communication 265b and forward the modified communication 265c to computing node H. However, communication 222-c is actually intercepted and handled by Communication Manager module R, which modifies the communication as appropriate, and forwards the modified communication over the interconnection network 250 to computing node H by communication 232-3. Communication Manager module R and/or Communication Manager module S may take further actions in this example to modify the communication from computing node A to computing node H or vice versa to provide logical networking functionality. For example, Communication Manager module S can provides computing node H with the hardware address corresponding to logical router L as part of response message 247-e by looking up the hardware address in stored mapping information 262. In one embodiment, a communication manager or computing node encapsulates a packet with another header or label where the additional header specifies the route of the packet. Recipients of the packet can then read the additional header and direct the packet accordingly. A communication manager at the end of the route can remove the additional header.

A user or operator can specify various configuration information for a virtual computer network, such as various network topology information and routing costs associated with the virtual 270a, 270b and/or substrate network 250. In turn, the ONM System Manager 290 can select various computing nodes for the virtual computer network. In some embodiments, the selection of a computing node can be based at least in part on a geographical and/or network location of the computing node, such as an absolute location or a relative location to a resource (e.g., other computing nodes of the same virtual network, storage resources to be used by the computing node, etc.). In addition, factors used when selecting a computing node can include: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes; constraints related to costs, such as based on fees or operating costs associated with use of particular computing nodes; or the like.

Route Selection on Substrate Network

Figure 3:
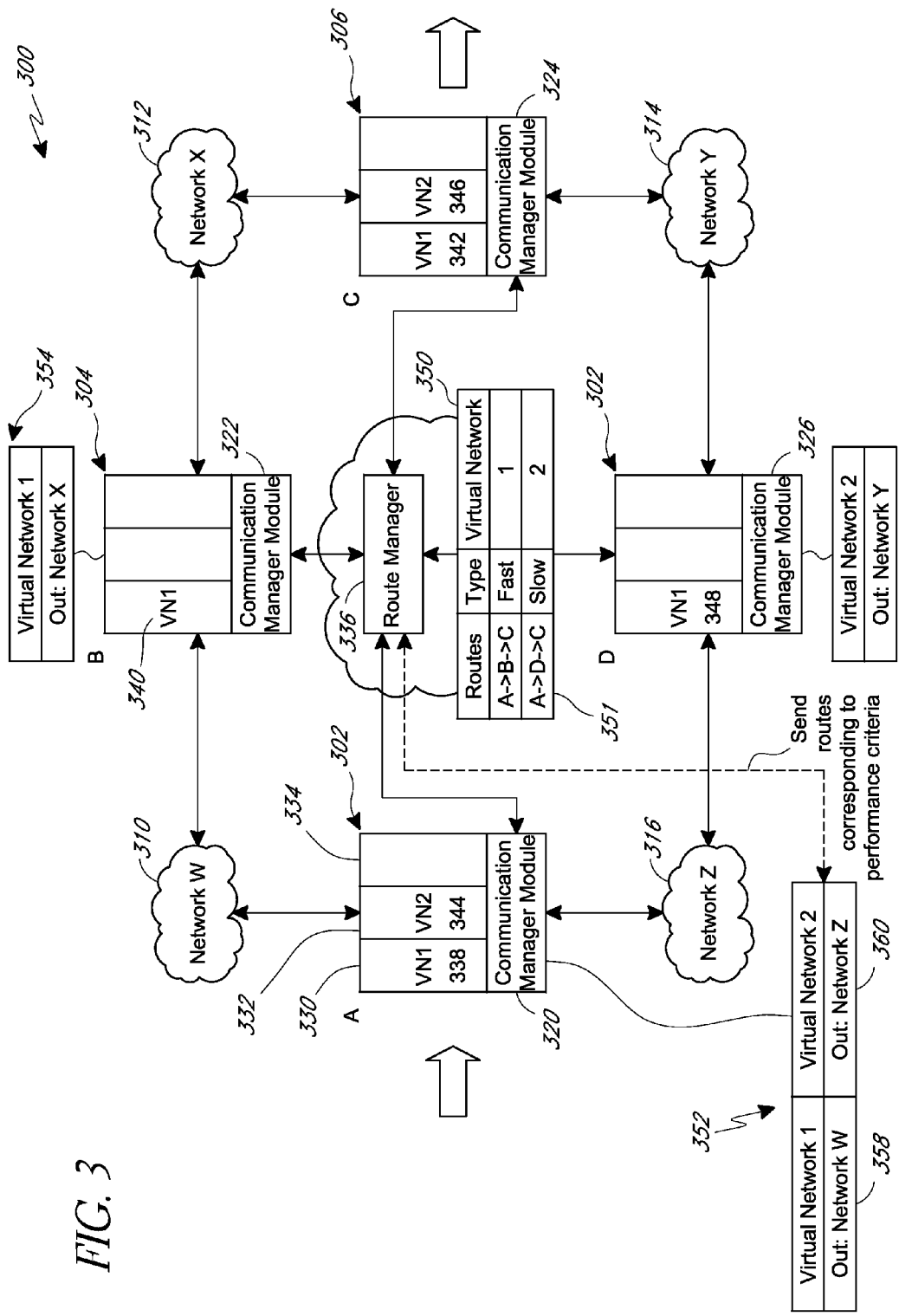
FIG. 3 illustrates an example embodiment of a substrate network configuration wherein routes are determined for associated overlay networks.

FIG. 3 illustrates an example embodiment of a substrate network 300 having a route manager 336 capable of determining routes for overlay networks. The substrate network 300 can be composed of one or more substrate components or nodes, such as computing nodes, routing nodes, communication links or the like. In FIG. 3, the substrate network 300 includes computing nodes A 302, B 304, C 306, and D 308, which are capable of simulating various components of one or more associated overlay networks. The nodes can be located on the same data center or in multiple data centers. Computing node A is interconnected to node B via network W 310, node B is connected to node C by network X 312, node C is connected to node D by network Y 314, and node D is connected to node A by network Z 316. Networks W, X, Y, and Z can include one or more physical networking devices, such as routers, switches, or the like, and can include private or public connections. Components shown in FIG. 3, such as the computing nodes and communication manager modules, can implement certain of the features of embodiments described above with respect to FIGS. 1 and 2.

In FIG. 3, nodes A 302, B 304, C 306, and D 308 are associated with a respective Communication Manager module 320, 322, 324, and 326. The communication manager modules can implement certain of the features described in the Communication Manager 150, 210, 260 and VM Communication manager 109*a*, 109*b*, 109*c*, 109*d* of FIGS. 1 and 2. For example, the Communication Manager module 320 for node A can operate on a hypervisor monitor of the computing node and can direct the communication of one or more virtual computing nodes 330, 332, 334 of node A. The computing nodes, communication managers and Route Manager 336 can be part of the same ONM system. In one embodiment, the computing nodes run the XEN operating system (OS) or similar virtualization OS, with the communication managers operating on domain 0 or the first OS instance and the virtual computing nodes being domain U or additional OS instances.

The communication manager modules in FIG. 3 are in communication with a Route Manager module 336, operating on one or more computing devices, that directs routing for the substrate network 300. In one embodiment, the Route Manager operates as part of the ONM System Manager module 110, 290 of FIGS. 1 and 2, with functionally combined into a single module. The Route Manager can be located within a data center or at a regional level and direct traffic between data centers. In one embodiment, multiple Route Managers can operate in a distributed manner to coordinate routing across multiple data centers.

In FIG. 3, two virtual networks are associated with the substrate network 300. Virtual network 1 (VN1) has components 338, 340, 342, associated with virtual computing nodes on computing nodes A 302, B 304, and C 306. Virtual network 2 (VN2) has components 344, 346, 348 associated with virtual computing nodes on nodes A, C, and D 308.

As the Routing Manager module 336 directs network traffic on the substrate network 300, traffic can be directed flexibly and various network configurations and network costs can be considered. For example, routing paths can be determined based on specified performance levels for the virtual networks. In one embodiment, if the user for VN1 is entitled to a higher service level, such as for faster speed (e.g. lower latency and/or higher bandwidth), traffic associated with VN1 can be routed on a "fast" path of the substrate network 300. For example, in one embodiment, traffic for "platinum" users is prioritized over traffic for "gold" and "silver" users, with traffic from "gold" users prioritized over "silver" users. In one embodiment, at least some packets of the user with the higher service level are prioritized over packets of a user with a lower service level, for example, during times of network congestion. The user may be entitled to a higher level because the user has purchased the higher service level or earned the higher service level through good behavior, such as by paying bills, complying with the operator's policies and rules, not overusing the network, combinations of the same, or the like.

The Route Manager 336 can store user information or communicate with a data store containing user information in order to determine the target performance level for a virtual network. The data store can be implemented using databases, flat files, or any other type of computer storage architecture and can include user network configuration, payment data, user history, service levels, and/or the like. Typically, the Route Manager will have access to node and/or link characteristics for the substrate nodes and substrate links collected using various network monitoring technologies or routing protocols. The Route Manager can then select routes that correspond to a selected performance level for the virtual network and send these routes to the computing nodes. For example, network W 310 and Y 312 can be built on fiber optic lines while network Y 314 and Z 316 are built on regular copper wire. The Route Manager can receive network metrics data and determine that the optical lines are faster than the copper wires (or an administrator can designate the optical lines as a faster path). Thus, the Route Manager, in generating a route between node A 302 and node C 306 for "fast" VN1 traffic, would select a path going through network W and Y (e.g., path A-B-C).

In another situation, where the user for VN2 is not entitled to a higher service level, VN2 traffic from node A 302 to node B 306 can be assigned to a "slow" or default path through network Y 314 and Z 316 (e.g. path A-D-C). In order to track routing assignments, the Routing Manager can maintain the routes and/or route association in a data store, such as a Routing Information Base (RIB) or routing table 350. The Route Manager can also track the target performance criteria 351 associated with a particular virtual network.

In order to direct network traffic on the substrate network 300, the Routing Manager 336 can create forwarding entries for one or more of the Communication Manager modules 320, 322, 324, 326 that direct how network traffic is routed by the Communication Manager. The Communication Manager modules can store those entries in forwarding tables 352, 354, 356, or other similar data structure, associated with a Communication Manager. For example, for VN1, the Route Manager can generate a control signal or message, such as a forwarding entry 358, that directs VN1 traffic received or generated on node A 302 through network W 310 (on path A-B-C). Meanwhile, for VN2, the Route Manager can generate a control signal or message, such as a forwarding entry 360, which directs traffic received on node A through network Z. The Route Manager can send these forwarding entries to the node A Communication Manager 320, which can store them on its forwarding table 352. Thus, network traffic associated with VN1 and VN2, destined for node C 306 received or generated on node A can travel by either path A-B-C or path A-D-C based on the designated performance level for VN1 and VN2.

While the example of FIG. 3 depicts only two virtual networks, the Route Manager 336 can similarly generate and maintain routes for any number of virtual networks. Likewise, the substrate network 300 can include any number of computing nodes and/or physical network devices. Routes can be determined based on multiple performance criteria, such as network bandwidth, network security, network latency, and network reliability. For example, traffic for a virtual network suspected of being used for spamming (e.g. mass advertisement emailing) can be routed through network filters and scanners in order to reduce spam.

Figure 4A:
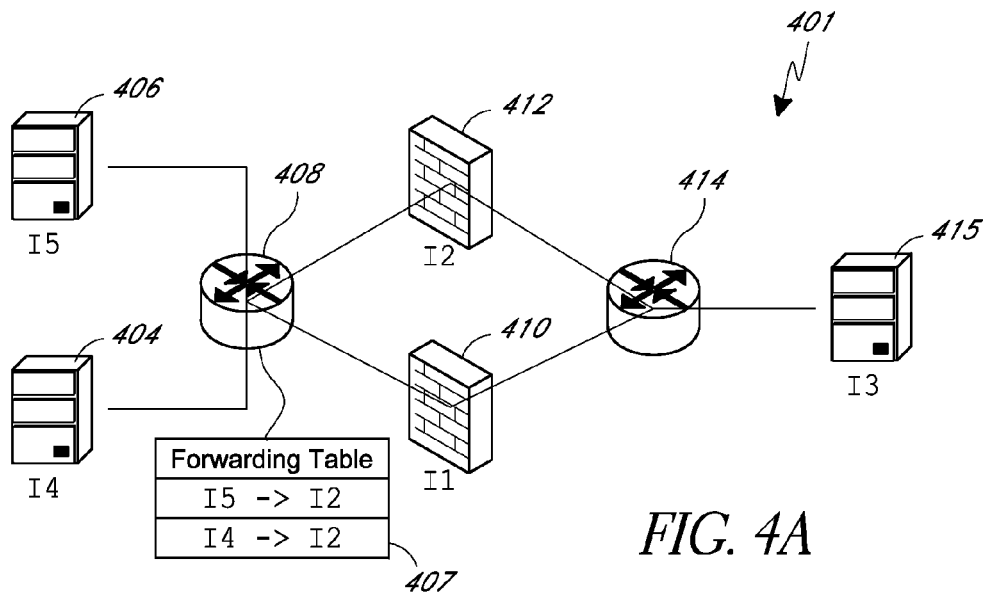
FIGS. 4A and 4B illustrate a virtual network and corresponding substrate network where substrate routing is independently determined from virtual routing.
Figure 4B:
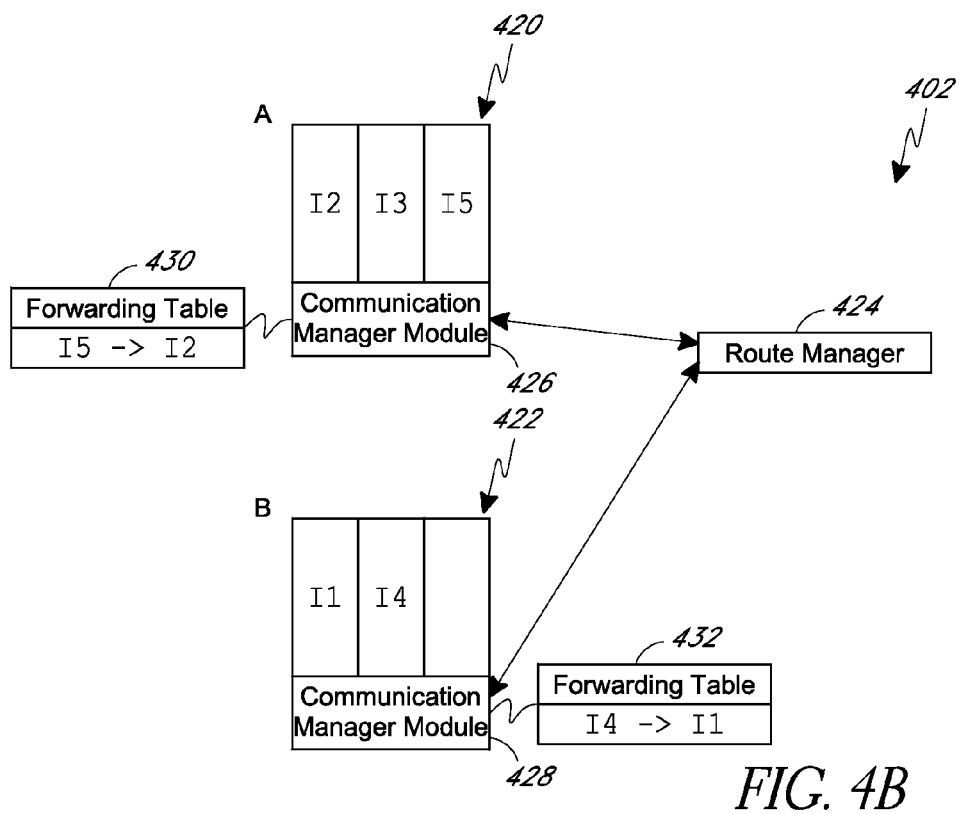

FIGS. 4A and 4B illustrate a virtual network 401 and corresponding substrate network 402 where substrate routing is independently determined from virtual routing. FIG. 4A illustrates a virtual network including several virtual network components. Virtual computing nodes I4 404 and I5 406 are connected to a logical router 408. The logical router can implement certain of the features described in the logical router 270*a*, 270*b* of FIG. 2. The logical router is connected to firewalls I1 410 and I2 412. The logical router is configured to direct traffic from I5 to I2 and I4 to I2, as would be the case if I2 were a backup firewall. The forwarding table associated with logical router 409 reflects this traffic configuration. I1 and I2 are connected to a second router 414. The second router is connected to another virtual computing node, I3 415. Thus, based on the topology and associated forwarding table of the virtual network 401, traffic from I4 and I5 to I3 passed through I2.

Meanwhile, FIG. 4B illustrates an example topology of the substrate network 402 associated with the virtual network 401. The substrate network includes computing node A 420, computing node B, and a Route Manager 424. Substrate nodes A and B are each associated with a Communication Manager 426, 428. Node A is simulating the operation of virtual components I2, I3 and I5 while Node B is simulating the operation of virtual components on I1 and I4 on their respective virtual machines. The Route Manager can then use information regarding the assignments of virtual components to computing nodes to optimize or otherwise adjust routing tables for the substrate network. The Route Manager can receive such information from the Communication Managers and/or the System Manager. For example, assuming I1 and I2 are identical virtual firewalls, the Route Manager can determine that because I5 and I2 are located on the same computing node, while I4 and I1 are located on the other node, virtual network traffic can be routed from I5 to I2 and from I4 to I1 without leaving the respective computing node, thus reducing traffic on the network. Such a configuration is reflected in the illustrated forwarding tables 430, 432 associated with the Communication Managers. Thus, routes on the substrate network can be determined independently of virtual network routes.

In some embodiments, the Route Manager 424 or System Manager can optimize or otherwise improve network traffic using other techniques. For example, with reference to FIGS. 4A and 4B, another instance of I3 can be operated on node B 422, in addition to the instance of I3 on node A. Thus, virtual network traffic from I5-I2-I3 and I4-I1-I3 can remain on the same computing node without having to send traffic between computing nodes A and B. In one embodiment, substrate traffic can be optimized or otherwise improved without having different forwarding entries on the substrate and the virtual network. For example, with reference to FIG. 4B, I4 can be moved from computing node B 422 to node A 420, thus allowing virtual traffic from I5 and I4 to I2 to remain on the same computing node. In this way, a user monitoring traffic on logical router 408 would see that traffic is flowing according the forwarding table in the router, that is, substrate routing is transparent to the user. Other techniques for optimizing traffic by changing the association of virtual components with virtual machines and/or duplicating components can also be used.

In some situations, it can be desired that substrate routes reflect routes specified in the virtual table. For example, the virtual network user can wish to control how traffic is routed in the substrate network. However, rather than giving the user access to the substrate network, which could put other users at risk or otherwise compromise security, a data center operator can propagate network configuration or virtual network characteristics specified by the user for the virtual network to the substrate network. This propagated data can be used in generating routing paths in the substrate network, thus allowing the user to affect substrate routing without exposing the substrate layer to the user.

Route Selection on Overlay/Virtual Network

Figure 5A:
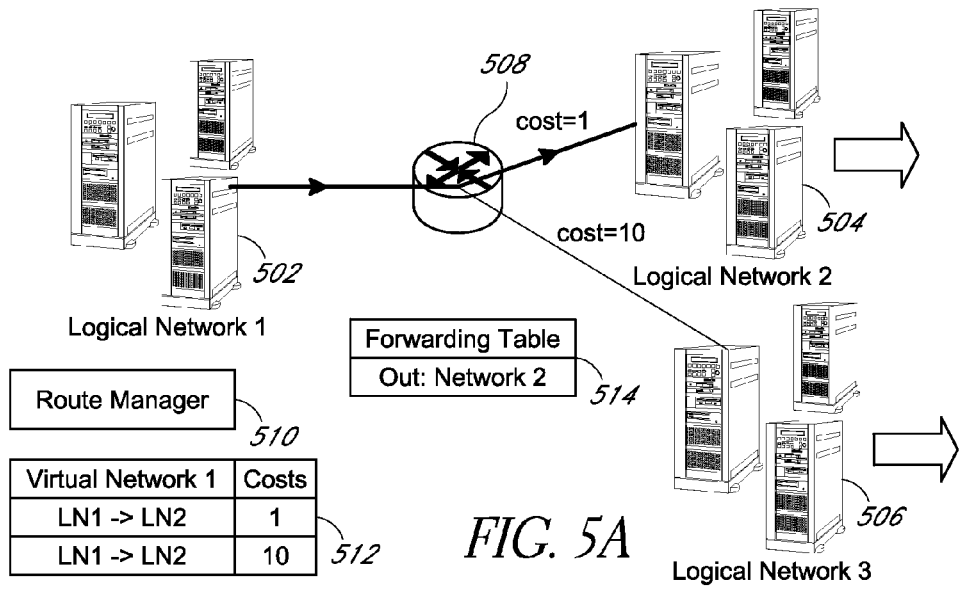
FIGS. 5A and 5B illustrate a virtual route selection propagated to the substrate, network.
Figure 5B:
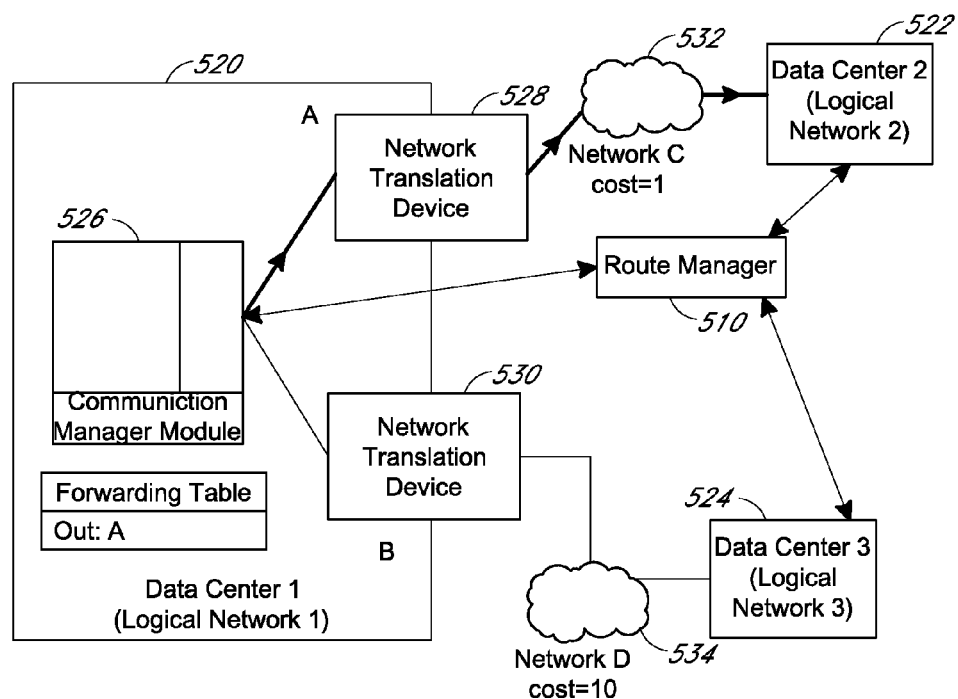

FIGS. 5A and 5B illustrate a virtual route selection propagated to the substrate network. FIG. 5A illustrates a virtual network topology where logical network 1 (LN1) 502 is connected to logical network 2 (LN2) 504 and logical network 3 (LN3) 506 by a logical router 508. The current preferred routing path specified by the user is from LN1 to LN2.

A user may wish to specify a route for various reasons. For example, routing costs through LN2 can be cheaper than LN3, such as when LN2 and LN3 are in different locations with different ISPs and one ISP charges lower rates than another. In another example, LN3 can be a backup virtual network for LN2, and used only in some situations, such as for handling overflow from LN2.

Referring back to FIG. 5A, the user can specify preferred routes through the virtual network and/or characteristics or costs associated with the virtual components, such as monetary costs, packet loss rates, reliability rate, and/or other metrics. These characteristics can be assigned to the virtual components, such as the virtual computing nodes, node links, logical routers/switches or the like. The Route Manager 510 can then determine routing tables 512 and/or forwarding tables 514 for the virtual network.

FIG. 5B illustrates an example of a substrate route that can correspond to the virtual route in FIG. 5A. In the figure, there are three data centers 520, 522, 524 corresponding to the logical networks 502, 504, 506 of FIG. 5A. In data center 1 (DC1), a computing node 526 is connected to a network translation device A (NTD A) 528 and a network translation device B (NTD B) 530. The network translation devices are connected to external networks C 532 and D 534, respectively.

The network translation devices can serve as a gateway or entry/exit point into the virtual network. In some embodiments, the network translation devices can translate between a first addressing protocol and a second addressing protocol. For example, if the virtual network is using IPv6 and the external networks are using IPv4, the network translation devices can translate from one addressing protocol to the other for traffic in either direction. In one embodiment, users connect from their private networks to the data centers via a VPN or other connection to a network translation device, which translates and/or filters the traffic between networks.

Referring back to FIG. 5B, network C 532 connects data center 2 522 to NTD A 528. Network D 534 connects data center 3 524 to NTD B 530. The Route Manager module 510 is in communication with data center 1 520, data center 2 522, and data center 3 524, particularly with the Communication Manager for the computing node 526.

From information associated with the virtual network, the Route Manager 510 can determine that the user wants to route traffic from LN1 to LN2. The Route Manager can then "favor" substrate routes associated with the LN1 to LN2 virtual path. For example, the Route Manager can specify a low routing cost (e.g. cost 1) for communications, such as data packets, travelling on Network C relative to Network D (e.g. cost 10) such that during route determination, routes through Network C are favored. In one, embodiment, the Route Manager can apply a coefficient to stored substrate costs in order to favor one route over another. In another example, explicit routing paths can be set up corresponding to the virtual route. The Route Manager can identify routes in its routing table and communicate those routes with one or more Communication Managers.

Referring back to FIG. 5B, when the computing node 526 receives or generates a packet destined for LN2 or a network reachable from LN2, the computing node can be configured by the Route Manager to send packets through NTD A 528 as it lies on the route including network C 532.

By propagating virtual network configuration data to the substrate, and using that configuration data in substrate route calculation, a mechanism is provided for a virtual network user to affect substrate routing. In some embodiments, the virtual configuration data can be used in determining association of the virtual components with the substrate components. For example, components of the same virtual network can be associated with the same substrate computing node or on computing nodes connected to the same switch in order to minimize or otherwise improve substrate network traffic. Configuration data can also be provided the other way and, in some embodiments, the user and/or virtual network can be provided with additional substrate information, such as characteristics of the underlying associated substrate components (e.g. performance, costs) in order to make more informed routing decisions.

Figure 6:
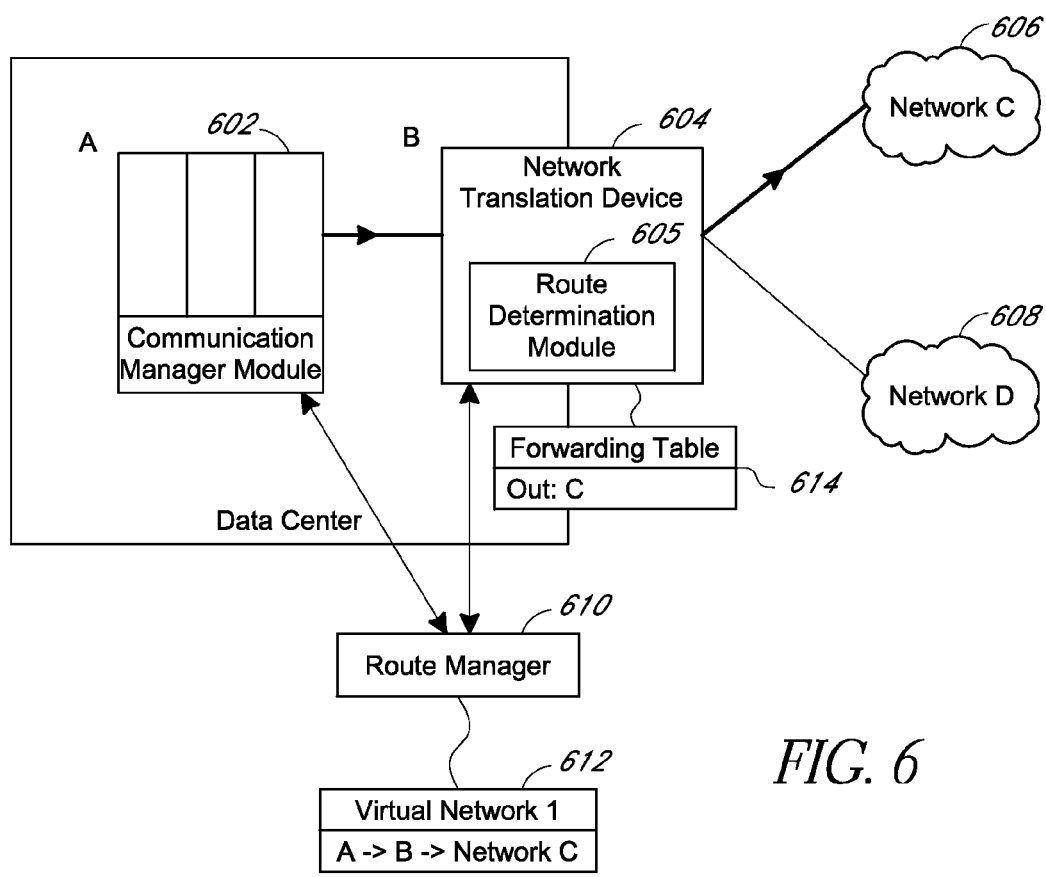
FIG. 6 illustrates an example embodiment of a substrate network, wherein a network translation device determines routes into or out of a virtual network.

FIG. 6 illustrates an example substrate network wherein a network translation device determines routes into or out of a virtual network. In FIG. 6, a communication, such as a data packet, leaves computing node A, which is associated with a virtual network, through NTD B 604. The network translation device can include a Route Determination module 605 for determining the packet route. NTD B is connected to network C 606 and network D 608.

In FIG. 6, the Route Manager 610 receives a network configuration or determines that route A-B-C is preferred or has a cheaper cost. The Route Manager can store the route in a routing table 612. The Route Manager can then send forwarding entries to the NTD B 604 that configure it to send traffic through network C 606. NTD B can contain multiple forwarding entries for multiple virtual networks, such that data for one virtual network can be sent through network C, while another virtual network sends data through network D. In some cases, network packets with the same source and/or destination are sent by different networks based on the associated virtual network.

In some embodiments, the substrate component may not have a Communication Manager or a Route Determination module and other ways of coordinating routing can be used. For example, a substrate component, such as an ordinary router or a network translation device, can be set up multiply on separate paths. Using blacklists, network traffic for a particular virtual network can be allowed on one path but blocked on others. The Route Manager can send a control signal or message updating the blacklists to manage the data flow.

In other embodiments, substrate components can implement IP aliasing, where, for example, "fast" path packets use one set of IP addresses, while "slow" path packets use another set of IP addresses. When the substrate component receives the packet, it can determine which path to use based on the IP address. The Route Manager can send a control signal or message to assign IP addresses to the components based on the type of traffic handled.

Other ways of differentiating how packets are handled by substrate components include: tagging of packets, such as by Multiprotocol Label Switching (MPLS); MAC stacking where a packet could have multiple MAC addresses, the first MAC address for a substrate component, such as a switch, and a second MAC address for a next component either on the "fast" or the "slow" path; and using Network Address Translation (NAT) devices on both ends of a network in order to redirect traffic into the network, such as by spoofing or altering an destination address for an incoming packing and/or altering an source address of an outgoing packet. In some embodiments, the Route Manager generates control signals or messages for coordinating traffic on the substrate network for the various techniques described above.

Virtual Network Route Selection Process

Figure 7A:
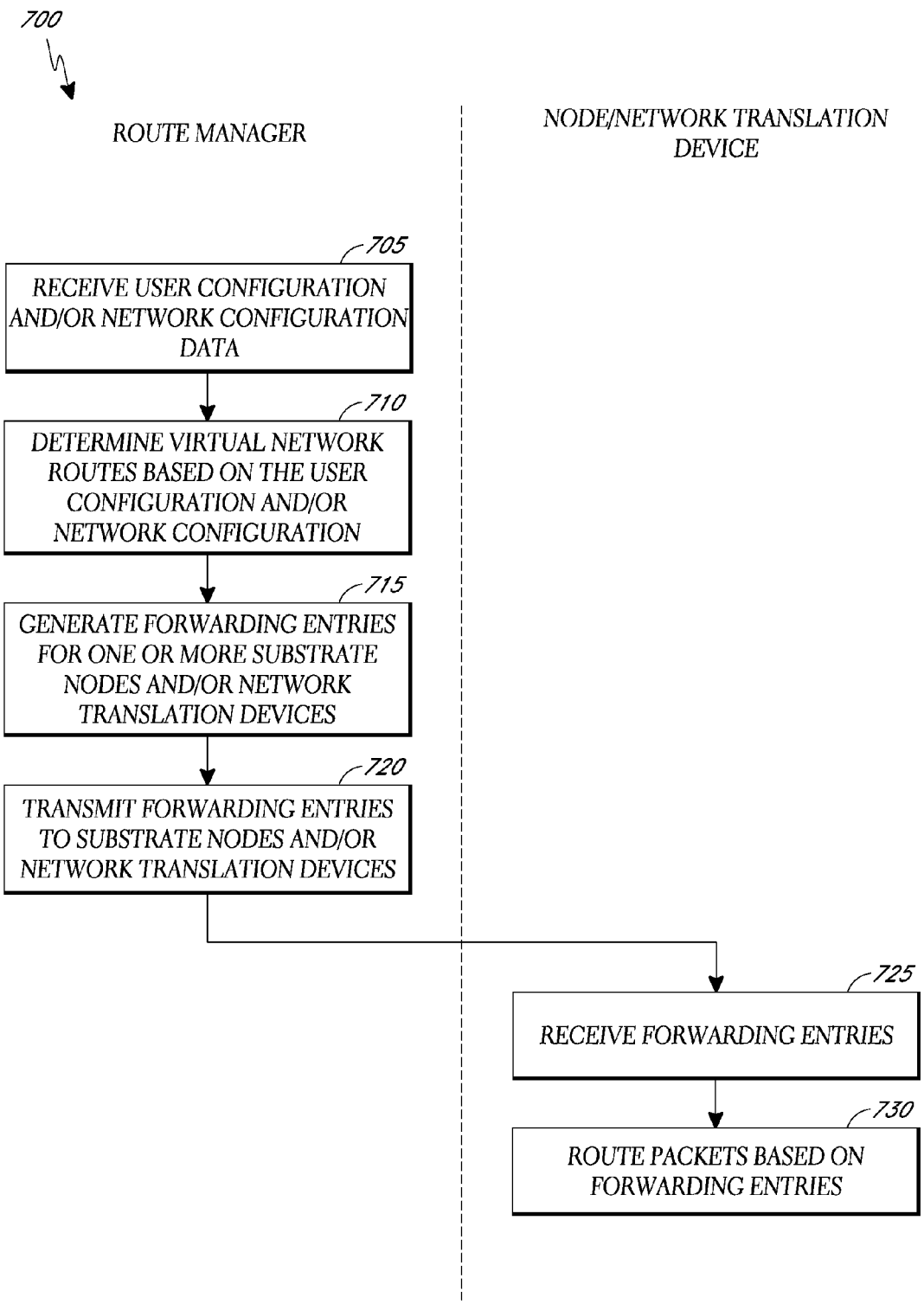
FIG. 7A illustrates a flow diagram for a process of propagating virtual routes to a substrate network.

FIG. 7A illustrates a flow diagram for a process 700 of propagating virtual routes to a substrate network usable in the example networks described above. The virtual routes can be based on network configuration data provided by a virtual network user, such as costs, component characteristics, preferred routes, and/or the like.

At block 705, the Route Manager module receives user configuration and/or network configuration data, such as, for example, policy based routing decisions made by the user. In some embodiments, a user interface is provided, allowing a user to specify configuration data. The Route Manager can receive the configuration data from a data store, for example, if user configuration and/or network configuration data are stored on the data store after being received on the user interface or otherwise generated. In some embodiments, the configuration data can include explicit routing paths through the virtual network. In some embodiments, the configuration data can specify associated costs for traversing components of the virtual network, such as links and/or nodes. These costs can be based on monetary costs, packet loss rates, reliability rate, and/or other metrics. These costs can be provided by the user to configure the virtual network provided by the data center operator. However, costs and other network configuration data can come from the data center operator themselves in addition to or instead of from the user. For example, the data center operator can use the virtual network to provide feedback to the user on routing costs, such as by associating monetary use costs for the substrate computing nodes and/or components. In one example, the data center operator can specify a high cost for a high speed network link or high powered computing node so that the virtual network user can take into account that cost in configuring the virtual network.

At block 710, the Route Manager module determines virtual network routes based on the user configuration and/or network configuration data. In some embodiments, routing protocols or the route determination algorithms of the routing protocols, such as BGP, OSPF, RIP, EIGRP or the like, can be used to determine virtual routes.

At block 715, the Route Manager determines one or more forwarding entries for substrate network components, such as computing nodes, network translation devices, or the like. As the Route Manager can determine routing paths and propagate routing decisions to the substrate components, the Route Manager can coordinate routing within a data center and/or between multiple data centers.

At block 720, the Route Manager transmits the forwarding entries to the substrate components. At block 725, the substrate component receives the forwarding entries. The substrate network components can store the forwarding entries in FIB tables or similar structures. Generally, a Communication Manager on the substrate component receives and processes the forwarding entry and manages communications of the substrate component.

However, as discussed above, network traffic can also be coordinated for substrate components without a Communication Manager using instead, for example, a NAT device or the like. In some embodiments, the Route Manager can send blacklist updates, manage tagging of the packets, generate stacked MAC addresses, or the like.

At block 730, the substrate components route packets received or generated according to the stored forwarding entries. Generally, a Communication Manager on the substrate component manages the packet routing and refers to the forwarding entries to make forwarding decisions.

Substrate Network Route Selection Process

Figure 7B:
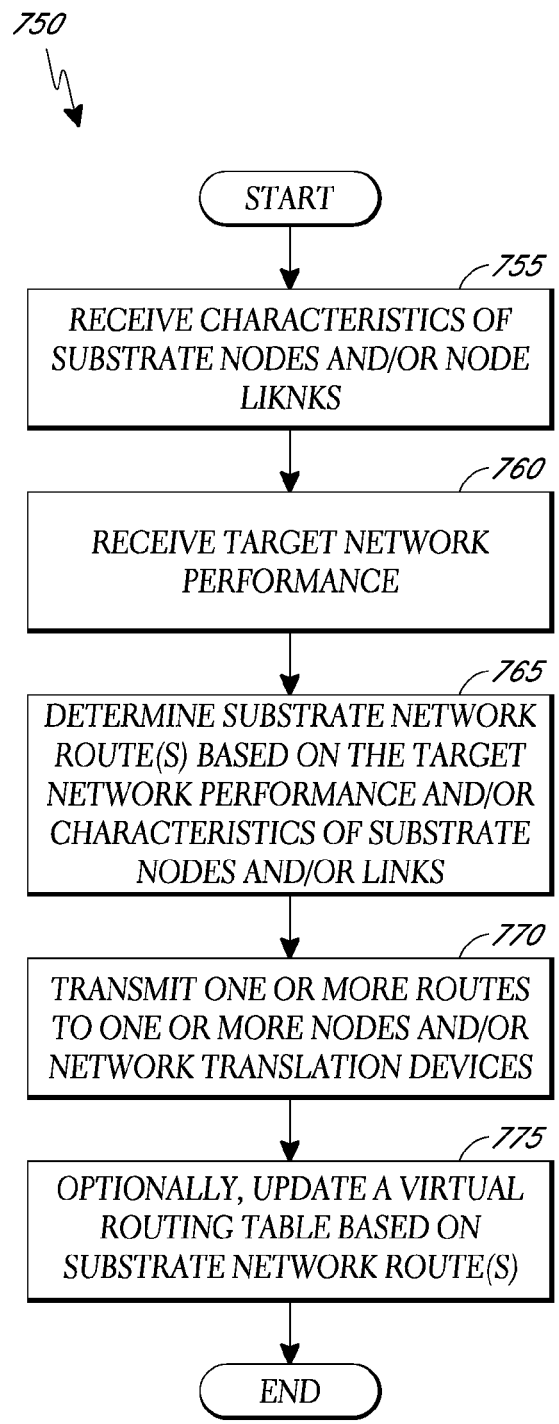
FIG. 7B illustrates a flow-diagram for a process of deteiiiuining substrate routing based on target performance characteristics of the associated virtual network.

FIG. 7B illustrates a flow-diagram for a process 750 for determining substrate routing based on target performance characteristics of the associated virtual network usable in the example networks described above. In some instances, the Route Manager can optionally generate a virtual routing table for the virtual network before determining substrate routing. The virtual routing table can be used to determine virtual routing paths, allowing optimization of network traffic by selective association of the virtual network components with substrate computing nodes, such as by taking into account physical location and virtual network traffic patterns. However, generation of the virtual routing table is not necessary as the substrate routes can be determined independently of the virtual routes, as will be described below. In addition, user configuration and/or network configuration data provided by the user can be used to describe the virtual network, without needing to generate a virtual routing table.

At block 755, the Route Manager receives characteristics of the substrate nodes and/or node links. The Route Manager can receive the characteristics data from a data store. In some embodiments, a user interface is provided, allowing a user to specify characteristics data. The characteristics can describe such things as monetary costs, network bandwidth, network security, network latency, network reliability and/or the like. These characteristics can be used in a cost function for determining substrate routing paths. This information can be kept by the Route Manager or data source accessible by the Route Manager.

At block 760, the Route Manager receives a target network performance for the virtual network. The target performance can be based on a purchased service level by the user, user history, security data or the like. For example, a service level purchased by a user can have minimum bandwidth, latency, or quality of service requirements. In another example, a user can be a new customer with an unknown payment history such that the user is provisioned on a "slow" virtual network in order to minimize incurred expenses in case the user fails to pay. In another example, a user identified as carrying dangerous or prohibited traffic, such as viruses, spam or the like, can be quarantined to particular substrate components. During quarantine, the virtual network components can be assigned to specialized substrate components with more robust security features. For example, the substrate components can have additional monitoring functionally, such as a deep-packet scanning ability, or have limited connectivity from the rest of the substrate network.

At block 765, the Route Manager determines substrate network routes based on the target network performance and/or characteristics of the substrate nodes and/or links. In one embodiment, the Route Manager can use the characteristic data in a cost function for determining routes. Which characteristic to use or what level of service to provide can be determined by the performance criteria or target performance. For example, for a "fast" route, the Route Manager can use bandwidth and/or latency data for the substrate network to generate routes that minimize latency, maximize available bandwidth, and/or otherwise improve network performance.

The Route Manager can re-determine routes as needed based on changes in the network, the configuration data, and/or the performance level. For example, if a user has purchased N gigabits of "fast" routing but has reached the limit, the Route Manager can generate new routes and shift the user to "slow" routing.

At block 770, the Route Manager transmits forwarding entries for one or more routes to one or more nodes and/or network translation devices. In some embodiments, the Route Manager determines forwarding entries for the substrate components and sends those forwarding entries to the substrate components on the path. In some embodiments, the Route Manager can send blacklist updates, manage tagging of data packets, and/or generate stacked MAC addresses.

At block 775, the Route Manager can optionally update the virtual routing table based on substrate network routes. By changing the virtual network routing table based on the substrate routes, the virtual network can stay logically consistent with the behavior of the substrate network. Thus, users won't necessarily be confused by discrepancies in the virtual routing.

Tiered Network Flow Analysis

FIGS. 8-11 depict various example systems for performing tiered network traffic flow analysis. In some embodiments, the systems of FIGS. 8-11 can be implemented on virtual networks, substrate networks, or managed computer networks, such as those depicted in FIGS. 1-7B.

Figure 8:
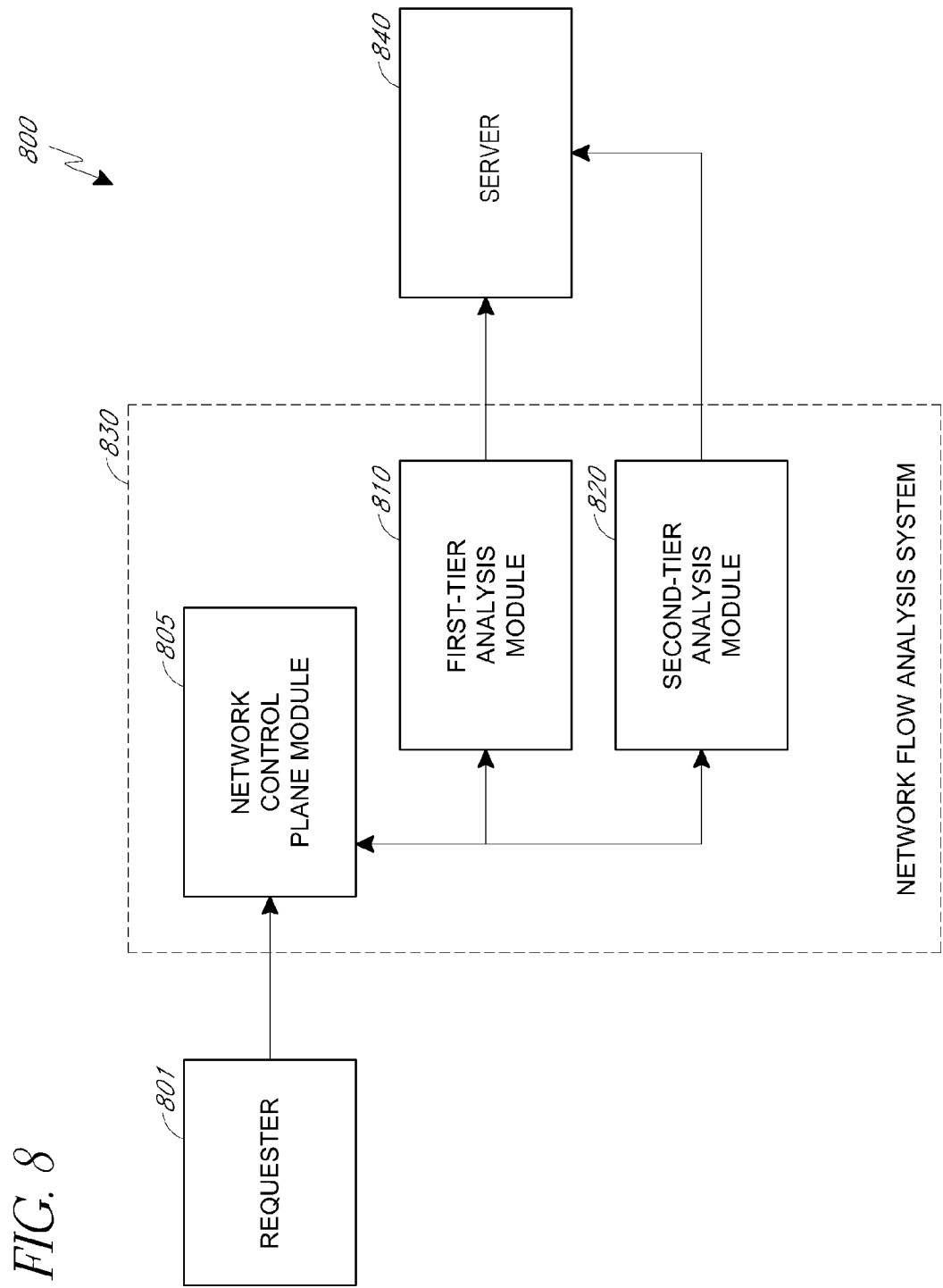
FIG. 8 depicts a first example system for tiered network flow analysis.

FIG. 8 depicts a first example multi-tiered system 800 for performing tiered analysis, such as intrusion detection analysis. In some embodiments, tiered analysis can be performed using two or more tiers of analysis. In some embodiments, when a network flow is received, a network control plane module 805 directs the network flow to a first-tier analysis computer, module, or system 810, for first-tiered analysis. In some embodiments, the first-tier analysis is relatively fast and inexpensive. If any criteria are matched during the first-tier analysis, then a signal or flag may be sent to a network control plane module 805, which can then redirect any subsequent packets or network flow that match the flagged criteria to a second-tier analysis computer, system, or module 820. The second-tier analysis can be deeper and more computationally expensive than the first-tier analysis. If no criteria are matched during the second-tier analysis, then the network flow can, for example, be forwarded to its intended recipient, such as server 840 in FIG. 8. Various embodiments of first- and second-tier analysis are discussed herein.

Two-tiered analysis can be provided on every network flow or on a subset thereof. In one embodiment, each virtual network in the ONM systems described above can benefit from this two-tiered analysis. In other embodiments, the two-tiered analysis is a for-fee service. For example, some virtual network customers of the ONM systems described above may pay to receive both tiers of analysis service. In some embodiments, the customers can be charged for time on the second-tier analysis module, based on network resources consumed (e.g., bandwidth, number of flows analyzed, CPU resources, or the like), combinations of the same, and the like.

The two-tier analysis can be implemented using various embodiments of systems described with respect to the figures. In some embodiments, two-tiered analysis is performed at the substrate layer described above. For example, a Communication Manager module, such as 210 in FIG. 2, can include two computers, one of which performs first-tier analysis and the other of which performs second-tier analysis. The analysis can also be performed by System Manager modules 260 or 290 on network flows to and from computing node A 205a to computing node H 255b. Similarly, any of Communication Manager modules 320, 322, 324, 326, 420, 422, 526, 602; Route Manager 336, 424, 510, 610; System Determination module 605; network flow analysis systems 830; 1030; 1130 can perform two-tiered analysis either alone (performing both tiers) or in combination (performing the two tiers on different modules, processes, computers, or systems). In some embodiments, two-tiered analysis is performed on the virtual network. For example, two-tiered analysis can be performed in a virtual network by logical routers 270a, 270b, 408, 508 or any other appropriate virtual module or set of modules.

Returning to FIG. 8, network flow analysis system 830 can include a first-tier analysis module 810 and a second-tier analysis module 820. In various embodiments, there may also be multiple second-tier analysis modules 820. These second tier analysis modules 820 may be used interchangeably by multiple first-tier analysis modules 810, or one or more of the second-tier analysis modules 820 may be used for a specialized purpose. For example, in a system with multiple second-tier analysis modules 820, one or more of the second-tier analysis modules 820 may be specialized for distributed denial-of-service attack mitigations, intrusion detection, and/or virus checking. In some embodiments, a first-tier analysis module 810 may, upon a flow matching a certain criteria, flag the flow for redirection to a second-tier analysis module 820. The second-tier analysis module 820 may then analyze subsequent packets of the flow and determine that the network flow should be analyzed by one or more specialized second-tier analysis modules 820, such as those described above.

Figure 11:
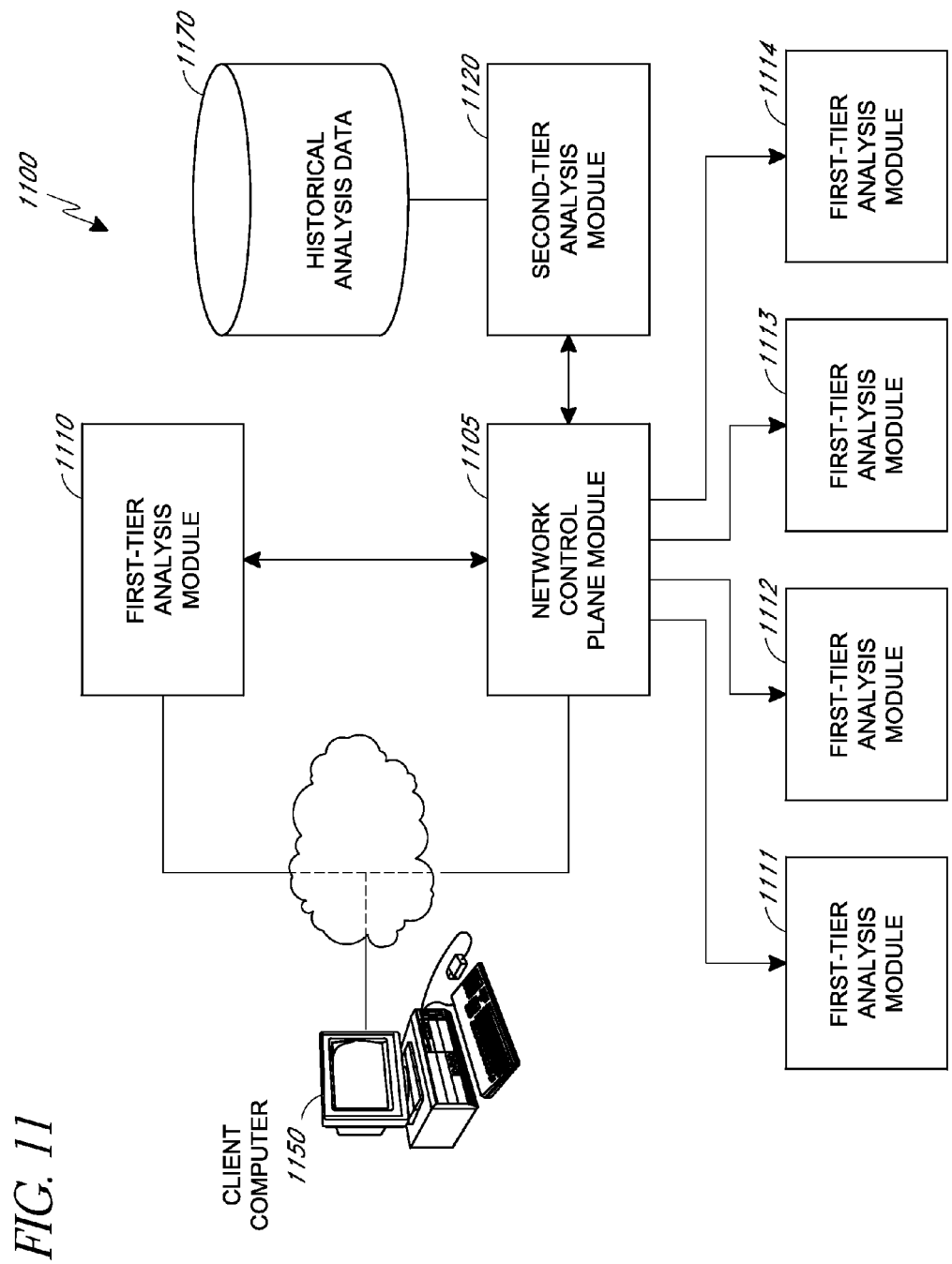
FIG. 11 depicts a third example system for tiered network flow analysis.

System 830 can also be in communication with a server 840. A network flow can be received from the requester 801 at the system 830. Various embodiments of network flows and the kind of analysis performed in the system 830 as part of the first-tier analysis module 810 and/or the second-tier analysis module 820 are discussed elsewhere herein. In some embodiments, the first-tier analysis module 810 and the second-tier analysis module 820 can run on separate computers, and system 830 can be virtual, diagrammatic, conceptual, or otherwise encompass modules 810 and 820 running on different systems. Further, as depicted in FIG. 11, a second-tier analysis module 1105 can receive network flows flagged by multiple first-tier analysis modules 1110-1114. Additionally, in some embodiments, if one of the first-tier analysis modules 1110 flags a network flow for redirection, then the control plane module 1105 may also redirect subsequent packets of matching network flows from the other first-tier analysis modules 1110-1114 to the second-tier analysis module 1120.

Returning again to FIG. 8, the first-tier analysis module 810, the second-tier analysis module 820, the network control plane module 805, and the server 840 may be separate processes and/or run on separate machines; or two or more may run on the same machine or as part of the same process. For example, the first-tier analysis module 810 can perform analysis that is not as computationally expensive as the second-tier analysis performed on the second-tier analysis module 820. The two processes can run on the same machine or on different machines, and the resources dedicated to the two systems can be proportional to the resources needed. For example, if a second-tier analysis module 820 uses more resources than a first-tier analysis module 810, then more resources (e.g., processing cycles, memory, etc) can be dedicated to the second-tier analysis module 820.

The first-tier analysis module 810 may also run on the same physical machine or process as the server 840 and the second-tier analysis module 820 and the network control module 805 can run on separate physical machines or processes. The network control module 805, first-tier analysis module 810, the second-tier analysis module 820 and/or server 840 can also be, in some embodiments, virtual machines. For example, the first-tier analysis module 810 can be implemented in the domain 0 or the first OS instance in one implementation of a XEN or other virtual machine system. The second tier (or other tier) analysis module(s) 820 can be implemented in a separate physical server or in another virtual machine running on the same physical server as the first-tier analysis module 810. As discussed above, virtual machines can be distributed over a substrate system, and the virtual machines can be running on the same machine, on different machines, or can be distributed over multiple machines.

In some embodiments, a requester 801 of a server 840 in the system 800 can interact with the network flow analysis system 830. The features of the network flow analysis system 830 can advantageously be hidden from or abstracted away from the requestor 801 in certain embodiments. For instance, the network flow analysis system 830 can appear as a single system to the requestor 801, regardless of whether the analysis modules 810 and 820 are running on the same physical computer, on two different physical computers, or are each distributed over one or more physical computers. The encapsulation techniques described herein, for example, may provide for hiding at least some of the physical path of any particular network packet by encapsulating the packet before routing it within the substrate network, and then unencapsulating it upon further transmission. In this way, in certain embodiments, the network path (through a first-tier of analysis or second- or subsequent-tier of analysis) can be hidden or abstracted from the requestor 801. Further, viewing the analysis system 830 as a single entity can be beneficial in that it can provide a simpler view of the network to the requester 801. If system 830 is a single entity, then the sender and receiver cannot identify or detect when a network flow is sent for first first-tier or second-tier analysis (e.g., traceroute may not reveal that the flow has been redirected).

In some embodiments, if a first-tier analysis module 810 and second-tier analysis module 820 are separate physical devices, then redirecting the network flow to the second-tier analysis module 820 can include using NAT devices on both ends of a network in order to redirect both directions of traffic to the second-tier analysis module 820. In some embodiments, this can be accomplished by spoofing or altering a destination address for an incoming packet and/or altering a source address of an outgoing packet. In some embodiments, if the first-tier analysis module 810 and second-tier analysis module 820 are separate physical devices, then sending the network flow to the second-tier analysis module 820 can include using unencrypted tunnels to redirect the network flow.

The server 840 can be a webserver, application server, a database server, or any other appropriate type of server or service that a requester 801 may want to access. The connection between the requester 801 and the analysis system 830, between the analysis system 830 and the server 840, as well as between any two systems, computers, or devices discussed herein can be any appropriate type of connection, such as the Internet, a private network, a wired network, a wireless network, a packet switched network, a direct wired connection, etc. In addition, although two tiers of network flow analysis are shown in the depicted embodiment, it will be apparent from this disclosure that additional tiers beyond two may be used to detect network intrusion or match other criteria.

In some embodiments, requester 801 can be a client system 801, such as a client on a managed (e.g., overlay) computer network, such as the ONM systems described above, is attempting to send a network flow to a recipient 840 (e.g., server 840). The network flow, in some embodiments, can flow through the network flow analysis box 830. In various embodiments, a first-tier analysis is performed by the first-tier analysis module 810, and if any intrusion issues are suspected, then the network control plane module 805 redirects the flow to a second-tier analysis module 820. If no intrusion issues are detected in the second-tier analysis (or in the first-tier analysis), then the flow is forwarded to the recipient 840; otherwise actions can be taken on the network flow, as described elsewhere herein. The system 800 can detect and correct actions taken by client systems accessing any of the managed networks described above. For example, for a provider of managed networks and managed systems, multiple client systems can be interacting with one another and with others on the network or on the Internet. If one of the client systems is sending spam or viruses or is otherwise behaving in a way that would be considered an intrusion, then a system such as system 810 can help counteract those intrusion actions made by client systems 840.

Figure 9:
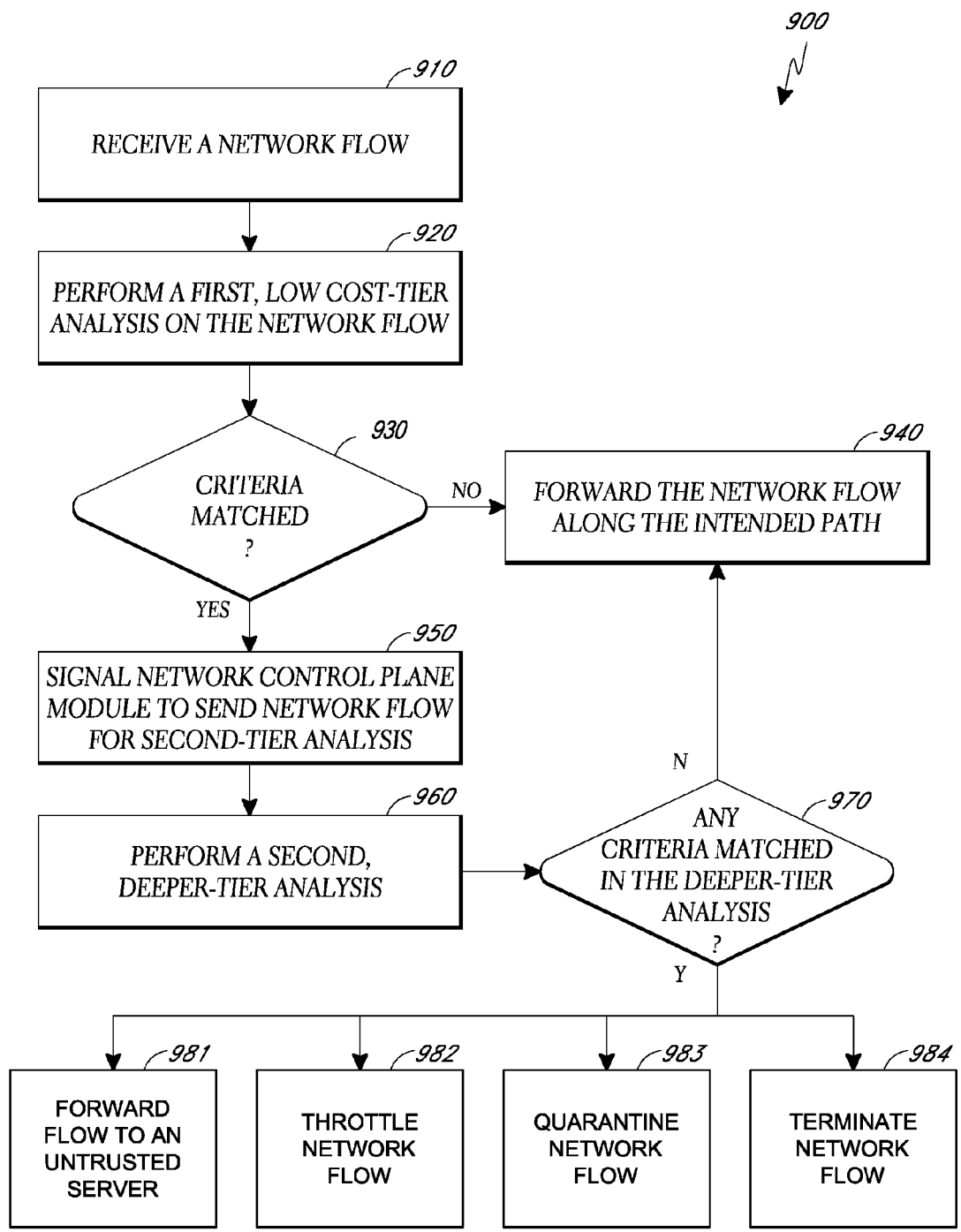
FIG. 9 depicts a method for tiered network flow analysis.

FIG. 9 depicts a method 900 for tiered network flow analysis. The method 900 can be implemented by the network flow analysis system 800 or by any of the other systems described herein. In some embodiments of method 900, a network flow is received from a requester over the public Internet or a private network. Briefly, the first-tier analysis module can perform a first, rapid analysis on the incoming network flow (block 920). If any intrusion issues are suspected or other criteria are met based on the first-tier analysis (block 930), then the control plane can be signaled to redirect subsequent portions of or packets from the flow to a second-tier analysis module (block 950). The second-tier analysis module can perform a deeper analysis on the network flow in order to determine whether any intrusion issues exist with or other criteria are met by the network flow (block 960). If no criteria are matched in the first-tier analysis or the second-tier analysis, then the network flow is forwarded to its intended recipient (block 940). If the second-tier analysis matches criteria, then the network flow can be forwarded to an untrusted server (block 981), throttled (block 982), quarantined (block 983), or terminated (block 984), among other options.

In block 910, a network flow is received. The network flow can contain data packets, such as IP or TCP data packets, handshake requests, such as a portion of the three-part TCP handshake or an SSL handshake, or any other appropriate data packets. The network flow can be received from a requester or client system, such as those depicted in FIGS. 8-11. The entity sending the network flow can be a program or computer that is attempting to establish a connection, attempting to send data, attempting to access a module on a webserver, attempting to access an API, such as a web service API, or any other applicable type of entity, performing or attempting to perform any applicable action.

In response to receiving the network flow in block 910, a first, low-cost tier of analysis is performed on the network flow in block 920. In some embodiments, the first-tier analysis can be performed at a rate that allows the first-tier analysis to be performed on the entire network flow without causing more than a small or no delay in the network flow. In some embodiments, the first-tier analysis can include checking for known intrusion methods. Known intrusion methods can include checking for the calling of particular web services APIs; checking whether a particular object on a webserver has been requested more than a threshold number of times during a particular time period; checking to see if a fixed-string is matched in the network flow; whether an SSL or other handshake has been seen in the flow; whether there is an attack, such as a worm, virus, SYN flooding, etc; whether the connection rate is too high; whether the flow is associated with an untrusted source or destination; whether some user-specified condition is met; combinations of the same, and the like.

In some embodiments, the first-tier analysis includes checking whether particular web services APIs have been called more than a threshold number of times during a particular time period. For example, a particular web services API can be called, such as an API for a database service, in e-commerce fulfillment service, a messaging service, a monitoring service, an administrative service, a payment service, a storage service, or any other appropriate service. There can be various intrusion-related reasons to check to see whether a particular web services API has been called more than a threshold number of times. For example, it can be uncommon to have a certain service, such as a payment service for small commercial customers, called more than, for example, a certain number of times per minute or other time period. If the payment service API is called more than a certain number of times in a single time period by a small commercial customer, then that network flow can be sent for deeper analysis as indicated in block 930.

The first-tier analysis can also include a check to determine whether other conditions are met. For example, in some embodiments, the first-tier analysis includes determining whether a particular object or module on a webserver has been requested more than a threshold number of times in a particular time period. Many webservers have numerous objects that can be called by clients and other entities interacting with the webserver. Some of the objects on the webserver may be called often by clients interacting with the webserver. Other objects or modules on the webserver, however, may be rarely used. As such, in some embodiments, the first-tier analysis can include determining whether a rarely-called module on the webserver has been called as part of a network flow (at all, or over a threshold number of times during a particular time period). If the rarely-called module on the webserver has been called, then deeper analysis can be performed on the network flow, as indicated in block 930.

Another type of analysis that, in some embodiments, can be performed in the first-tier analysis is determining whether a particular object on a webserver has been requested more than a threshold number of times during a particular time period. For example, one type of intrusion performed by "bad" actors is repeatedly requesting an object, such as a PEG image or other file from the webserver. In some embodiments, the first-tier analysis of block 920 can detect whether any particular object has been requested more than some threshold such as, for example, three times per minute. If a particular object has been requested more than some threshold, then in block 930 a decision can be made to direct the flow for deeper analysis in block 950.

Although regular expression matching can, in some embodiments, be too computationally intensive for first-tier analysis, matching a fixed string in a network flow may be possible. For example, if network flows containing a particular network path are known to present particular intrusion issues, then that particular network path can be checked against the network flow as a fixed string. Relatedly, in some embodiments, the traffic can be redirected based on information in any OSI layer. For example, all traffic to a particular URL may be redirected for deeper inspection. Further, in some embodiments, if a virus or other intrusion program is detectable by looking for a particular fixed string, then the network flow can be checked against that particular fixed string. Additionally, other vulnerability signatures and header field matches can be checked in the network flow, in block 920. If any of these vulnerabilities, signatures, or fixed strings are matched, as determined in block 930, then the network flow can be redirected for deeper analysis in block 950.

The first-tier analysis may also include, in some embodiments, a check to determine for a network flow, if it is an SSL network flow, whether an SSL handshake has already been received. Another check can include determining whether SYN flooding is occurring. SYN flooding is an attack in which the sender receives multiple SYN messages to a target system. If the target system allocates resources for each SYN message received, then the target system can be overwhelmed by the SYN messages. Similarly, the first-tier analysis can also look at the connection rates. For some servers, a high connection rate can be appropriate because, for example, the server is heavily used in legitimate activities. A high connection rate can also be associated with attacks on a target. Therefore, in some embodiments, the first-tier analysis can include looking at the connection rates for particular targets. If the connection rate is above a certain threshold, then in block 930 a decision can be made to redirect the network flow for deeper analysis in block 950.

Another type of analysis that can be performed in the first-tier analysis, in some embodiments, is performing a check to determine whether the network flow was sent from or is associated with an untrusted source. It may be known, for example, that a particular computer or set of computers in an open lab at a university are associated with sending network intrusion attacks. As such, the first-tier analysis can include determining whether a network flow is from that set of computers, as determined by IP address, machine address, netblock, or other means. If it is determined in block 930 that the network flow is associated with that set of computers, then in block 950 the network flow can be flagged for deeper analysis.

In some embodiments, for example, using the system of FIG. 11, a user at a client computer 1150 can indicate that particular network flows or particular types of network flows should be flagged for deeper analysis. The user can know, for example, that a network flow going to a particular destination, from a particular source or netblock, or some combination of the two, is suspected of being associated with a network intrusion. Once the user has indicated this, the first-tier analysis can be extended to include looking for this particular signature of destination and/or source. This step is not depicted in method 900. Additional features of the system shown in FIG. 11 are described in greater detail below. As another example of client indications for redirecting network flows, the first-tier analysis may include causing the redirection of traffic that the client has indicated it desires to have further analysis on. For example, in some embodiments, the client may want some or all traffic that is not from an authenticated user to be sent for second-tier analysis. The client may indicate to have network flow redirected for second-tier analysis if the client has had suspicious flow recently or in the past, etc. The client setting the policy, rules, or criteria for redirecting network flows for second tier analysis may be an end user of the networking service or may be a service provider that, in turn, provides services (e.g., including network services) to its customers. More examples of client-indications for redirecting network flows are discussed herein with respect to FIG. 11.

Referring again to FIG. 9, in response to the first-tier analysis being performed in block 920 and a determination is made whether any criteria are matched in block 930. If no issues are detected based on the first-tier analysis, the network flow is forwarded along its intended path to its intended recipient in block 940. If, however, issues are detected in the first-tier analysis, the network flow is flagged and redirected for deeper analysis in block 950, thereby causing subsequent packets in the network flow to be sent for deeper inspection. In some embodiments, after a particular packet or set of packets in a network flow causes the network flow to be flagged and redirected for second-tier analysis, the network flow can be matched (either for subsequent redirection or for flagging in the first-tier analysis). The matching is not limited to the granularity of destination IP address in some implementations. The matching can be based, at least in part, on any of the source IP address, destination IP address, source MAC address, destination MAC address, protocol, Ethernet type, VLAN identifier, source port, destination port, combinations of the same, and the like.

In block 960, a deeper, second-tier analysis is performed. In some embodiments, the deeper, second-tier analysis can be more computationally intensive then the first-tier analysis. As such, in some embodiments, it can be beneficial to perform the first-tier analysis on the entire network flow and perform the deeper-tier analysis on a portion of a particular network flow or on a subset of the network flows that have been received, thereby conserving resources while still detecting intrusions. As noted, in certain embodiments, the second-tier analysis is performed on those flows for which an intrusion was detected during or suspected based on the first-tier analysis.

The deeper-tier analysis can include performing regular expression matching on the network flow. Some viruses, worms, and other intrusions can be detectable by performing regular expression matching to find related signatures or families of signatures. In some embodiments, the computational requirements for performing regular expression matching on the network flow can be relatively high. Therefore, the first-tier analysis might not include matching regular expressions. If the first-tier analysis includes performing a particular analysis (such as expression matching) on a subset or sample of packets in a network flow, then the second-tier analysis may include performing that particular analysis on all of the packets.

In some embodiments, the second-tier analysis can include checking the network flow against a vulnerability library. As noted above, in the first-tier analysis, a limited number of vulnerability signatures can be checked. In some embodiments, checking a small number of vulnerabilities can be possible in the first-tier analysis. Checking the network flow against an entire vulnerability library, however, can be too computationally intensive to perform in the first-tier analysis. As such, in some embodiments, the vulnerability library is checked in the second-tier analysis, e.g., if an intrusion is suspected based on the first-tier analysis.

In some embodiments, the second-tier analysis includes analyzing the flow with respect to a history of suspicious network flows. As noted above, network flows coming from a particular source or going to a particular destination or some combination thereof can be associated with network intrusions. If over time, a pattern of intrusions develops for a particular source, a particular destination, or a combination thereof, then this pattern can be determinable using the history of network flows. Thereafter, in some embodiments, any currently-received network flow can be checked against the history of network flows and their intrusions.

In some embodiments, the history of network flows can also be received from other systems performing first-tier analysis and/or second-tier analysis. For example, looking to FIG. 2, multiple Communication Manager modules 210 and 260 can each be performing first-tier analysis on network flows. System Manager module 290 can have a second-tier analysis module (not pictured) that is performing second-tier analysis for network flows on behalf of Communication Manager modules 210 and 260. Therefore, System Manager module 290 can provide second-tier analysis based on the store call information from both Communication Manager module 210 and Communication Manager module 260. Consider also FIG. 11 in which multiple first-tier analysis modules 1111-

1114 each signal flows (via the network control plane module 1105) for redirection to the second-tier analysis module 1120. In some embodiments, second-tier analysis module 1120 can also be coupled to and communicate with other second-tier analysis modules (not shown in FIG. 11). The information on past network flows can be stored in an attached historical analysis data source 1170, which may be a database, flat file, a webserver-based data retrieval system, a content-addressable storage system, or any other appropriate data source. As the second-tier analysis module 1120 is receiving information from a broad range of first-tier analysis modules, and possibly from other second-tier analysis modules, it can provide analysis based on more than just the intrusions that have been detected locally. Additionally, in some embodiments, multiple systems that are each performing second-tier analysis can communicate their historical information between or among themselves.

Additionally, in some embodiments, any type of analysis that is performed in the first-tier analysis in block 920 can also be performed in the second-tier analysis in block 960. Further, in some embodiments, the results of the first-tier analysis performed in block 920 can be used as part of the second-tier analysis in block 960. For example, in some embodiments, a second-tier analysis can use the information that, in the first-tier analysis, a particular suspect source had sent the network flow. Based on this information, the second-tier analysis can perform regular expression matching that would detect a particular virus that had been seen in network flows from that particular source before.

If no intrusion issues are identified in the second-tier analysis in block 970, then in block 940 the network flow is forwarded along its intended path. Forwarding a network flow along its intended path after the second-tier analysis can include sending an indication to the system that performed the first-tier analysis that it should continue sending the network flow along its intended path. In some embodiments, as depicted in FIG. 8, the second-tier analysis module, if no intrusion issues are detected in the second-tier analysis, can forward the network flow to a port associated with the intended recipient, server 840, or otherwise send the network flow to its intended recipient, server 840.

In some embodiments, the network flow sent to the second-tier analysis module can be a "copy" of the original network flow (e.g., via port mirroring or a virtual switched port analyzer (SPAN) port). The network flow can have already been forwarded to the intended recipient while or before the network flow was sent for second-tier analysis. As such, the network flow might not need to be forwarded if no issues are detected in the second-tier analysis.

If an intrusion issue is identified in the second-tier analysis, then various actions can be performed, as depicted by blocks 981-984. In some embodiments, the choice of which action to take on the network flow after an intrusion issue has been detected in the second-tier analysis can be based on numerous factors. In some embodiments, the type of intrusion detected can influence the choice of what action to take on the network flow. For example, if the signature associated with the virus, denial of service attack, or the like is detected, then the network flow might be terminated in block 984 or quarantined in block 983. As another example, if more than a threshold number of connections are received during a particular time period, then further connections made to the destination can be throttled in block 982. As yet another example, a network flow with a detected intrusion can be forwarded to an untrusted system in block 981 (see FIG. 10).

Figure 10:
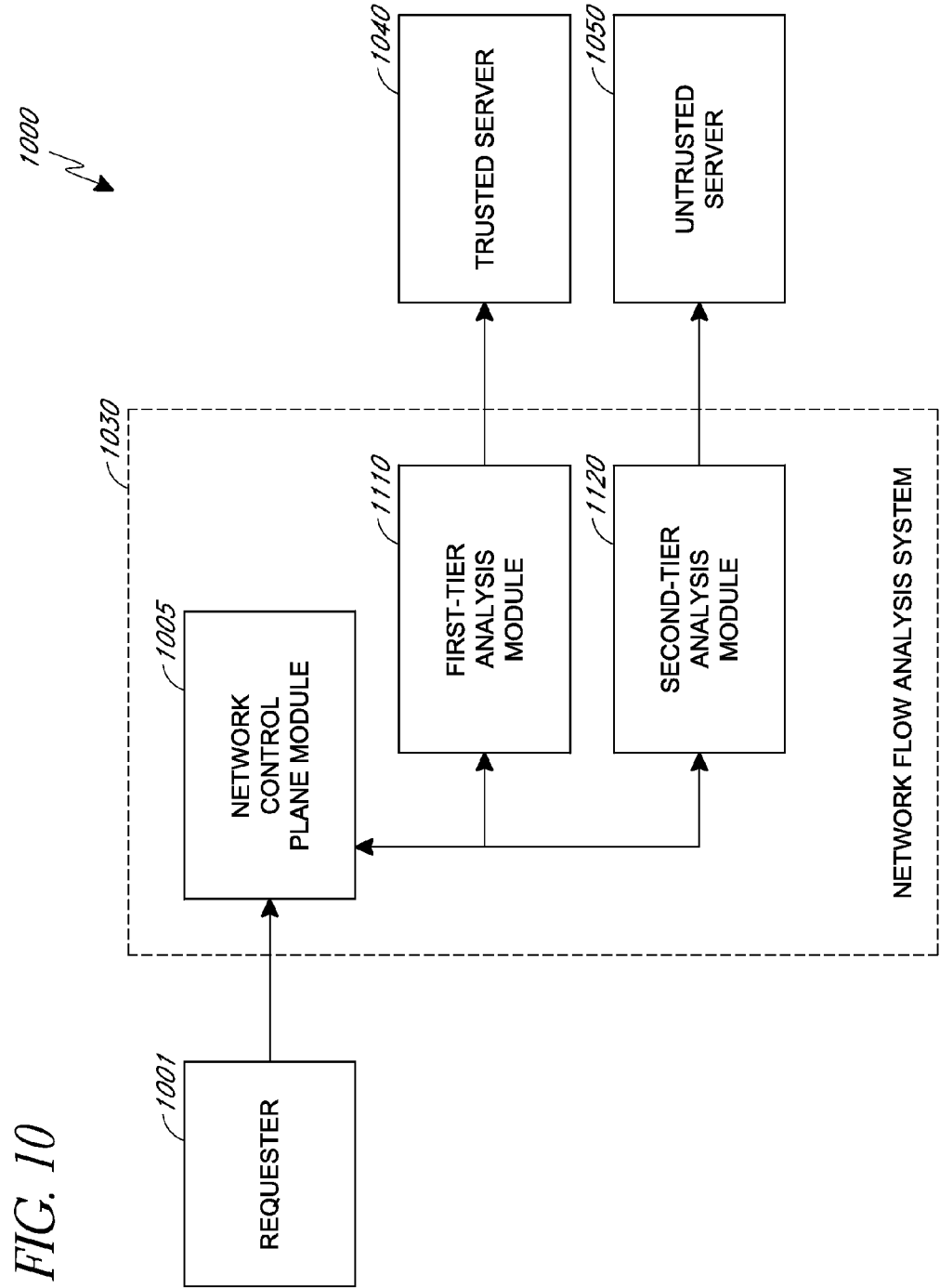
FIG. 10 depicts a second example system for tiered network flow analysis.

FIG. 10 depicts another example system 1000 for tiered network flow analysis. FIG. 10 is similar, in some embodiments, to FIG. 8, where similar tag numbers indicate similar elements. As noted above, in some embodiments, if a second-tier analysis identifies intrusion issues within incoming network flow, then the incoming network flow can be forwarded to an untrusted server, such as untrusted server 1050 of FIG. 10. In some embodiments, the untrusted server 1050 can be located in a secure portion of the target network. Forwarding the network flow to the untrusted server 1050 may allow the requester 1001 to interact with a server, while not exposing a trusted server 1040 to the suspicious network flow.

In some embodiments, the untrusted server 1050 can analyze the requestor's actions on the untrusted server 1050 over time. If the requestor's actions are turn out to be non-malicious, then in some embodiments, the untrusted server 1050 can redirect the requestor's subsequent network flows to the trusted server 1040. The untrusted server 1050 can also communicate its analysis of the requestor's network flows to the first and/or second tier analysis modules 1010, 1020. In response to receiving this analysis, the first and/or second tier analysis modules 1010, 1020 can adapt the network flow analysis algorithms used by one or both of these modules 1010, 1020. Thus, for example, if the untrusted server 1050 identifies the requestor's activity as non-malicious, the first and/or second tier analysis modules 1010, 1020 can direct network flows corresponding to such activity to the trusted server 1040 instead of the untrusted server 1050 in the future.

FIG. 11 depicts another example system for tiered network flow analysis. System 1100, as discussed elsewhere herein, can allow users on client computers 1150 to indicate suspicious activity and suspicious network flows. The client computer may use a network service, such as a web service, a web page, etc., to communicate the redirection criteria to the first-tier analysis module 1110-1114 (and/or the network control plane module 1105 or second-tier analysis module 1120). These indications can be used in the first-tier analysis or the second-tier analysis. System 1100 illustrates that a single second-tier analysis module 1120 can provide deeper analysis for multiple first-tier analysis modules 1110-1114. Additionally, in various embodiments, the history of first-tier intrusion and second-tier analysis for various network flows can be stored in a historical analysis data source 1170. In some embodiments, a second-tier analysis module 1120 can perform second-tier analysis based at least in part on information stored in the historical analysis data source 1170. In some embodiments, this aggregate analysis can help detect distributed intrusion attacks, such as distributed denial of service attacks. This can be performed even if first-tier analysis modules 1110-1114 span customer, geographic, or other boundaries. In some embodiments, not depicted in FIG. 11, first-tier analysis modules 1110-1114 can perform analysis at least part based on information stored in the historical analysis data source 1170.

In various embodiments, analysis systems described herein can be implemented as part of a data center 100 or 160, on a substrate network 300 or 402, as part of a virtual network 401, as part of a logical network 502, 504, or 506, as part of a virtual or physical router, or on any other appropriate substrate, physical, virtual, or logical system described herein. Other embodiments of systems using analysis including first-tier analysis modules and second-tier analysis modules are considered within the scope of the disclosure.

Terminology

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or other optical media, or any other form of computer-readable storage medium known in the art. An exemplary storage medium can be coupled to the processor such that the processor can read information from, and write information to, the storage medium. In some embodiments, the storage medium can be integral to the processor. The processor and the storage medium can reside in an ASIC. The ASIC can reside in a user terminal. In some embodiments, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for performing tiered network flow analysis, the system comprising:
   a computer system comprising one or more processors, the computer system programmed to implement:
   a first-tier analysis module and a second-tier analysis module;
   wherein the first-tier analysis module, executing on at least one of the one or more processors, is configured to:
      receive a first portion of a network flow associated with a recipient;
      perform a first-tier analysis, having a first computational cost, on the first portion of the network flow to detect any matches to a first set of criteria; and
      in response to detecting a match to the first set of criteria during the first-tier analysis of the first portion of the network flow, flagging the network flow to be subsequently mirrored to the second-tier analysis module for further analysis, and forwarding the network flow to the recipient; and
   wherein the second-tier analysis module, executing on at least one of the one or more processors, is configured to:
      perform a second-tier analysis, having a second computational cost that is greater than the first computational cost, on a second portion of the network flow mirrored by the first-tier analysis module; and
      in response to detecting any matches to a second set of criteria during the second-tier analysis of the second portion of the network flow, perform an action in response to matching the second set of criteria,
   wherein said action comprises at least one of: terminating the network flow; quarantining the network flow; or throttling the network flow.

2. The system of claim 1, wherein the first-tier analysis module is implemented in a first physical computer and wherein the second-tier analysis module is implemented in a second physical computer.

3. The system of claim 1, wherein performing the first-tier analysis comprises checking the destination or source of the network flow.

4. The system of claim 1, wherein performing the first-tier analysis comprises checking for a known intrusion method.

5. The system of claim 1, wherein the first-tier analysis module is further configured to receive an indication from a customer that a particular type of network flow should be redirected; and wherein performing the first-tier analysis comprises determining whether said network flow is of the indicated particular type of network flow.

6. The system of claim 1, wherein the second-tier analysis module is one of a set of second-tier analysis modules, and first-tier analysis module is further configured to chose to flag the network flow for mirroring to the second-tier analysis module, from among the set of second-tier analysis modules, based at least in part on the criteria met in the first-tier analysis.

7. A system for performing tiered network flow analysis, the system comprising:
by a computer system comprising one or more physical computing devices:
receiving a first network flow, associated with a first recipient, at a first computer module;
performing a first-tier analysis, having a first computational cost, on the first network flow using the first computer module in order to detect whether any of a first set of criteria are matched by the first network flow;
in response to matching one or more criteria in the first set of criteria during the first-tier analysis, forwarding to the first recipient a subsequent network flow and mirroring the subsequent network flow to a second computer module configured to perform a second-tier analysis, having a second computational cost greater than the first computational cost, on the subsequent network flow in order to detect any matches with a second set of criteria in the subsequent network flow, wherein the mirroring of the subsequent network flow is hidden from a sender of the subsequent network flow; and
in response to detecting any matches with the second set of criteria in the subsequent network flow, performing an action on the subsequent network flow, wherein said action comprises at least one of: terminating the network flow; quarantining the network flow; or throttling the network flow.

8. The method of claim 7, wherein the method further comprises, in response to the lack of a match in the subsequent network flow to the second set of criteria, forwarding the subsequent network flow to an output port.

9. The method of claim 7, wherein the first network flow comprises one or more packets and wherein performing a first-tier analysis on the network flow comprises analyzing at least one packet of the one or more packets.

10. The method of claim 7, wherein performing the first-tier analysis comprises determining an access rate for a particular object or API.

11. The method of claim 7, wherein performing the first-tier analysis comprises checking the destination or source of the first network flow.

12. The method of claim 7, wherein performing the first-tier analysis comprises checking for a known intrusion method.

13. The method of claim 7, wherein the method further comprises receiving an indication from a customer that a particular type of network flow has an intrusion issue and performing the first-tier analysis comprises determining whether the second portion of the network flow is of the indicated particular type of network flow.

14. The method of claim 7, wherein the method further comprises, in response detecting matches with the second set of criteria in the subsequent network flow, flagging the subsequent network flow for redirection to a second recipient different from said first recipient.

15. The method of claim 7, wherein the first computer module is a first virtual machine on a virtual network and the second computer module is a second virtual machine on the virtual network.

16. The method of claim 7, wherein the first computer module and the second computer module are distinct physical computer systems.

17. A non-transitory computer-readable storage medium comprising computer-executable instructions for performing a method of tiered network communication analysis, the method comprising:
receiving a second portion of a network communication associated with a recipient, said second portion of the network communication having been forwarded to the intended recipient and mirrored based on an indication from a first-tier computer system that one or more of a first set criteria are matched in a first portion of the network communication in response to the first-tier computer system performing a first-tier analysis, having a first computational cost, on the first portion of the network communication;
performing a second-tier analysis, having a second computational cost greater than the first computational cost, on the second portion of the network communication on a second-tier computer system in order to detect whether any of a second set criteria are matched in the second portion of the network communication; and
in response to no issues in the second set of intrusion issues being detected in the second portion of the network communication,
hiding characteristics of the network communication from the recipient of the network communication.

18. The non-transitory computer-readable storage medium of claim 17, wherein performing the second-tier analysis comprises checking for network communication patterns across multiple network communications, some of said network communications being associated with computer systems separate from the first and second computer systems.

19. The non-transitory computer-readable storage medium of claim 17, wherein said hiding characteristics of the network communication causes a routing path of the network communication to be at least partially hidden from the recipient of the network communication.

20. The non-transitory computer-readable storage medium of claim 17, wherein performing the second-tier analysis comprises checking the second portion of the network communication against a vulnerability library.

21. The non-transitory computer-readable storage medium of claim 17, wherein the method further comprises, in response to issues in the second set of intrusion issues being detected in the second portion of the network communication, performing an action on the network communication.

22. The non-transitory computer-readable storage medium of claim 17, wherein performing the second-tier analysis comprises checking the second portion of the network communication against a history of suspicious network communications.

23. The non-transitory computer-readable storage medium of claim 17, wherein the method further comprises, in response to issues in the second set of intrusion issues being detected in the second portion of the network communication, flagging the network communication for a third-tier analysis and subsequent redirection to a third-tier analysis module.

* * * * *

UNITED STATES PATENT AND TRADEMARK OFFICE
CERTIFICATE OF CORRECTION

| | |
|---|---|
| PATENT NO. | : 8,510,821 B1 |
| APPLICATION NO. | : 12/825718 |
| DATED | : August 13, 2013 |
| INVENTOR(S) | : Brandwine et al. |

Page 1 of 1

It is certified that error appears in the above-identified patent and that said Letters Patent is hereby corrected as shown below:

In the Specification

In column 2 at lines 17-18, Change "deteiiuining" to --determining--.

In column 4 at line 29, Change "1private" to --private--.

In column 7 at line 33, Change "3" to --J--.

In column 13 at line 66, Change "an the" to --the--.

In the Claims

In column 26 at line 63, In Claim 6, Change "chose" to --choose--.

Signed and Sealed this
Eighth Day of April, 2014

Michelle K. Lee
*Deputy Director of the United States Patent and Trademark Office*